(12) United States Patent
Oasa

(10) Patent No.: US 11,199,260 B2
(45) Date of Patent: Dec. 14, 2021

(54) WORK VEHICLE AND CONTROL METHOD FOR WORK VEHICLE

(71) Applicant: KOMATSU LTD., Tokyo (JP)

(72) Inventor: Takahisa Oasa, Tokyo (JP)

(73) Assignee: KOMATSU LTD., Tokyo (JP)

( * ) Notice: Subject to any disclaimer, the term of this patent is extended or adjusted under 35 U.S.C. 154(b) by 317 days.

(21) Appl. No.: 16/476,685

(22) PCT Filed: May 29, 2018

(86) PCT No.: PCT/JP2018/020537
§ 371 (c)(1),
(2) Date: Jul. 9, 2019

(87) PCT Pub. No.: WO2019/003763
PCT Pub. Date: Jan. 3, 2019

(65) Prior Publication Data
US 2021/0140541 A1    May 13, 2021

(30) Foreign Application Priority Data
Jun. 27, 2017    (JP) .............................. JP2017-125377

(51) Int. Cl.
*F16H 61/431*    (2010.01)
*F16H 61/421*    (2010.01)
(Continued)

(52) U.S. Cl.
CPC ......... *F16H 61/431* (2013.01); *F16H 61/421* (2013.01); *F16H 61/472* (2013.01); *E02F 9/2253* (2013.01); *F16H 2059/6861* (2013.01)

(58) Field of Classification Search
CPC .... F16H 61/421; F16H 61/431; F16H 61/472; B60K 17/10; B60K 17/105; E02F 9/2253
See application file for complete search history.

(56) References Cited

U.S. PATENT DOCUMENTS 5,070,695 A    12/1991    Metzner
6,164,402 A *  12/2000    Hastreiter .............. B60K 17/10
                                                              180/243
(Continued)

FOREIGN PATENT DOCUMENTS

CN    101122330 A    2/2008
CN    105102813 A    11/2015
(Continued)

OTHER PUBLICATIONS

The extended European search report for the corresponding European application No. 18823198.9, dated Sep. 1, 2020.
(Continued)

*Primary Examiner* — Thomas E Lazo
*Assistant Examiner* — Michael Quandt
(74) *Attorney, Agent, or Firm* — Global IP Counselors, LLP

(57) ABSTRACT

A work vehicle includes an engine, a hydrostatic transmission, a storage device storing leakage flow rate data defining a relationship between a differential pressure of hydraulic fluid between the first drive circuit and the second drive circuit and a leakage flow rate of the hydraulic fluid in the hydraulic circuit in stalling, and a controller in communication with the storage device. The hydrostatic transmission includes a traveling pump, a hydraulic circuit with first and second drive circuits, and a traveling motor. The controller is configured to determine a target traction force of the work vehicle, determine a target differential pressure that is a target value of the differential pressure from the target traction force, determine the leakage flow rate from the target differential pressure with reference to the leakage flow rate data, and determine a target flow rate of the traveling pump from the leakage flow rate.

9 Claims, 16 Drawing Sheets

(51) Int. Cl.
*F16H 61/472* (2010.01)
*E02F 9/22* (2006.01)
*F16H 59/68* (2006.01)

(56) References Cited

U.S. PATENT DOCUMENTS

| | | | |
|---|---|---|---|
| 7,536,856 B2 | 5/2009 | Du et al. | |
| 7,926,267 B2* | 4/2011 | Koehler | F16H 61/431 |
| | | | 60/492 |
| 2008/0029327 A1 | 2/2008 | Carlson et al. | |
| 2010/0094515 A1 | 4/2010 | Shirao et al. | |
| 2011/0290074 A1* | 12/2011 | Schulte | F16H 61/462 |
| | | | 74/733.1 |
| 2011/0295473 A1 | 12/2011 | DeMarco et al. | |
| 2014/0200775 A1 | 7/2014 | Shirao | |
| 2014/0216023 A1 | 8/2014 | Rabhi | |
| 2014/0345890 A1 | 11/2014 | Nagamura et al. | |
| 2015/0192201 A1 | 7/2015 | Long et al. | |
| 2015/0361636 A1 | 12/2015 | Yoshizawa et al. | |
| 2016/0121900 A1 | 5/2016 | Yoshizawa et al. | |
| 2016/0145836 A1 | 5/2016 | Yamada et al. | |

FOREIGN PATENT DOCUMENTS

| | | |
|---|---|---|
| JP | 2008-275012 A | 11/2008 |
| JP | 2013-148199 A | 8/2013 |
| JP | 2013-210013 A | 10/2013 |
| JP | 2015-140579 A | 8/2015 |
| JP | 2015-140727 A | 8/2015 |
| WO | 2014/006302 A1 | 1/2014 |
| WO | 2015/093477 A1 | 6/2015 |

OTHER PUBLICATIONS

The International Search Report for the corresponding international application No. PCT/JP2018/020537, dated Aug. 14, 2018.
The Office Action for the corresponding Chinese application No. 201880007872.7, dated Apr. 27, 2020.

* cited by examiner

WORK VEHICLE AND CONTROL METHOD FOR WORK VEHICLE

CROSS-REFERENCE TO RELATED APPLICATIONS

This application is a U.S. National stage application of International Application No. PCT/JP2018/020537, filed on May 29, 2018. This U.S. National stage application claims priority under 35 U.S.C. § 119(a) to Japanese Patent Application No. 2017-125377, filed in Japan on Jun. 27, 2017, the entire contents of which are hereby incorporated herein by reference.

BACKGROUND

Field of the Invention

The present invention relates to a work vehicle and a control method for a work vehicle.

Background Information

Some work vehicles are equipped with a hydrostatic transmission. The hydrostatic transmission includes a traveling pump, a traveling motor, and a hydraulic circuit connecting the traveling pump and the traveling motor. The traveling pump is driven by the engine and discharges hydraulic fluid. The hydraulic fluid discharged from the traveling pump is supplied to the traveling motor via the hydraulic circuit. The traveling motor is driven by hydraulic fluid from the traveling pump. The traveling motor is connected to a traveling device of the work vehicle, and the work vehicle travels by driving the traveling motor. In the hydrostatic transmission, the transmission gear ratio can be controlled by controlling the displacement of the traveling pump and the displacement of the traveling motor.

The displacement of the traveling pump is controlled by a pump displacement control device. For example, as shown in Japanese Patent Laid-Open No. 2008-275012, the pump displacement control device includes a pump control cylinder. The pump control cylinder is connected to the swash plate of the traveling pump and changes the displacement of the traveling pump by changing the tilting angle of the swash plate. The pump control cylinder is controlled by the hydraulic pressure of a pump pilot circuit connected to the pump control cylinder.

FIG. 17 is a diagram showing PQ characteristics of a traveling pump according to the conventional art. In FIG. 17, the horizontal axis represents the displacement of the traveling pump, and the vertical axis represents the differential pressure (HST differential pressure) of the hydraulic circuit of the hydrostatic transmission. The PQ characteristics are changed according to engine speed. For example, the hydraulic pressure of the above-described pump pilot circuit is changed in accordance with the engine speed, whereby the PQ characteristics are changed as shown by PQ1 to PQ5 in FIG. 17. Specifically, as the engine speed increases, the PQ characteristics are changed from PQ5 toward PQ1. PQs in FIG. 17 indicates the PQ characteristic in stalling of the work vehicle. The PQ characteristic at stall indicates the characteristic (block characteristic) when the traveling motor is in a stall equivalent state by blocking the discharge port of the traveling pump. As shown in FIG. 17, at the time of stalling, the HST differential pressure increases in accordance with the increase of the displacement of the traveling pump.

As described above, when the PQ characteristic is changed according to the increase of the engine speed, the HST differential pressure in stalling changes as P1 to P3 according to the engine speed. In FIG. 17, PQmax indicates the maximum value of the HST differential pressure. Therefore, the HST differential pressure in stalling is maximum at P3.

SUMMARY

In the conventional work vehicle described above, the engine speed is set according to the operation amount of the accelerator. Therefore, assuming that the operation amount of the accelerator corresponding to the PQ characteristic PQ3 of FIG. 17 is 50%, the HST differential pressure in stalling becomes the maximum value P3 at the operation amount of 50%. The HST differential pressure corresponds to the traction force of the vehicle. Therefore, at 50% of the operation amount, the traction force in stalling becomes maximum.

FIG. 18A shows a change in traction force with respect to the operation amount of the accelerator in the conventional work vehicle described above. FIG. 18B shows a change in engine speed with respect to the operation amount of the accelerator in the above-described conventional work vehicle. As shown in FIG. 18A, the traction force increases from 0 to 50% of the operation amount, but the traction force becomes constant at the maximum value Fmax at 50% or more. On the other hand, the engine speed increases even if the operation amount is 50% or more.

Therefore, in the conventional work vehicle, the increase in the traction force is large when the operation amount is in the small to medium range, but the increase in the traction force is hardly in the medium to large range. Therefore, there is a problem that the operability is low. In addition, when the operation amount is in the range of medium to large, while the increase in traction force is small, the engine speed is unnecessarily increased, so that there is a problem that the fuel efficiency decreases.

In addition, the work vehicle mentioned above is provided with a traction control function for reducing the maximum traction force. In the work vehicle described above, the maximum traction force is reduced by limiting the displacement of the traveling motor to a predetermined upper limit value or less smaller than the maximum displacement.

However, in general, a hydraulic motor is more efficient when used with a large displacement. Therefore, as described above, limiting the traveling motor displacement for traction control has the problem of reduced efficiency.

In order to solve the above problems, it is preferable to control the traction force in stalling arbitrarily. However, it is not easy to control the traction force in stalling arbitrarily, accurately and efficiently.

An object of the present invention is to control a traction force in stalling arbitrarily, accurately and efficiently in a work vehicle provided with a hydrostatic transmission.

A work vehicle according to a first aspect includes an engine, a hydrostatic transmission, a storage device, and a controller. The hydrostatic transmission includes a traveling pump, a hydraulic circuit, and a traveling motor. The traveling pump is driven by the engine. The hydraulic circuit includes a first drive circuit and a second drive circuit and is connected to the traveling pump. The traveling motor is connected to the traveling pump via the hydraulic circuit. A closed circuit is formed by the traveling pump, the first drive circuit, the second drive circuit, and the traveling motor.

The storage device stores leakage flow rate data. The leakage flow rate data defines a relationship between a differential pressure of the hydraulic fluid between the first drive circuit and the second drive circuit and the leakage flow rate of the hydraulic fluid in the hydraulic circuit in stalling. The controller communicates with the storage device. The controller determines a target traction force of the vehicle. The controller determines a target differential pressure which is a target value of the differential pressure from the target traction force. The controller determines the leakage flow rate from the target differential pressure by referring to the leakage flow rate data. The controller determines the target flow rate of the traveling pump from the leakage flow rate.

In the work vehicle according to the present aspect, the leakage flow rate is determined from the target differential pressure by referring to the leakage flow rate data, and the target flow rate of the traveling pump is determined from the leakage flow rate. During stall, the leakage flow rate from the hydraulic circuit of the hydrostatic transmission is correlated with the differential pressure of the hydraulic circuit. In addition, in stalling, the leakage flow rate is correlated with the flow rate of the traveling pump. Therefore, by referring to the leakage flow rate data, it is possible to accurately determine the target differential pressure, that is, the target flow rate of the traveling pump corresponding to the target traction force. Thereby, the traction force in stalling can be controlled arbitrarily, accurately and efficiently.

The work vehicle may further include an accelerator and a sensor. The accelerator may be operably disposed by the operator. The sensor may output a signal indicating an operation amount of the accelerator. The controller may receive the signal from the sensor. The controller may determine the target traction force from the operation amount of the accelerator. In this case, it is possible to accurately achieve the target traction force according to the operation amount of the accelerator. Therefore, the operator can easily adjust the traction force of the vehicle by operating the accelerator.

The storage device may store target traction data. The target traction data may define a relationship between the operation amount of the accelerator and the target traction force. The controller may determine the target traction force from the operation amount of the accelerator with reference to the target traction data. In this case, it is possible to accurately achieve the target traction force according to the operation amount of the accelerator. Therefore, the operator can easily adjust the traction force of the vehicle by operating the accelerator.

The controller may determine the target torque of the traveling motor from the target traction force. The controller may determine the target differential pressure from the target torque and the displacement of the traveling motor. In this case, it is possible to accurately determine the target differential pressure corresponding to the target traction force.

The work vehicle may further include a temperature sensor. The temperature sensor may output a signal indicative of the temperature of the hydraulic fluid in the hydraulic circuit. The controller may receive the signal from the temperature sensor. The controller may correct the leakage flow rate according to the temperature of the hydraulic fluid. In this case, the target flow rate of the traveling pump can be more accurately determined in consideration of the temperature error of the hydraulic fluid.

The controller may increase the leakage flow rate in response to the increase in temperature of the hydraulic fluid. In this case, the target flow rate of the traveling pump can be more accurately determined in consideration of the temperature error of the hydraulic fluid.

The work vehicle may further include an input device for selecting a traction level. The controller may receive from the input device a signal indicative of the selected traction level. The controller may correct the target traction force according to the selected traction level. The controller may determine the target differential pressure from the corrected target traction force. In this case, the traction force can be controlled arbitrarily and precisely according to the selected traction level.

The controller may determine the target input horsepower to the hydrostatic transmission from the traveling pump target flow rate. The controller may determine the target rotational speed of the engine from the target input horsepower. In this case, it is possible to accurately determine the target rotational speed of the engine for achieving the target traction force.

A method according to a second aspect is a method executed by a controller for controlling a work vehicle. The work vehicle includes an engine and a hydrostatic transmission. The hydrostatic transmission includes a traveling pump, a hydraulic circuit, and a traveling motor. The traveling pump is driven by the engine. The hydraulic circuit includes a first drive circuit and a second drive circuit and is connected to the traveling pump. The traveling motor is connected to the traveling pump via the hydraulic circuit. A closed circuit is formed by the traveling pump, the first drive circuit, the second drive circuit, and the traveling motor.

The method according to the present aspect includes the following processing. The first process is to determine the target traction force of the vehicle. The second process is to determine the target differential pressure from the target traction force. The target differential pressure is a target value of the differential pressure of the hydraulic fluid between the first drive circuit and the second drive circuit. The third process is to determine the leakage flow rate from the target differential pressure by referring to the leakage flow rate data. The leakage flow rate data defines the relationship between the differential pressure and the leakage flow rate of the hydraulic fluid in the hydraulic circuit in stalling. The fourth process is to determine the target flow rate of the traveling pump from the leakage flow rate.

In the method according to the present aspect, the leakage flow rate is determined from the target differential pressure by referring to the leakage flow rate data, and the target flow rate of the traveling pump is determined from the leakage flow rate. During stall, the leakage flow rate from the hydraulic circuit of the hydrostatic transmission is correlated with the differential pressure of the hydraulic circuit. In addition, in stalling, the leakage flow rate is correlated with the flow rate of the traveling pump. Therefore, by referring to the leakage flow rate data, it is possible to accurately determine the target differential pressure, that is, the target flow rate of the traveling pump corresponding to the target traction force. Thereby, the traction force in stalling can be controlled arbitrarily, accurately and efficiently.

According to the present invention, in a work vehicle provided with a hydrostatic transmission, the traction force in stalling can be controlled arbitrarily and accurately and efficiently.

DETAILED DESCRIPTION OF EMBODIMENT(S)

Figure 1:
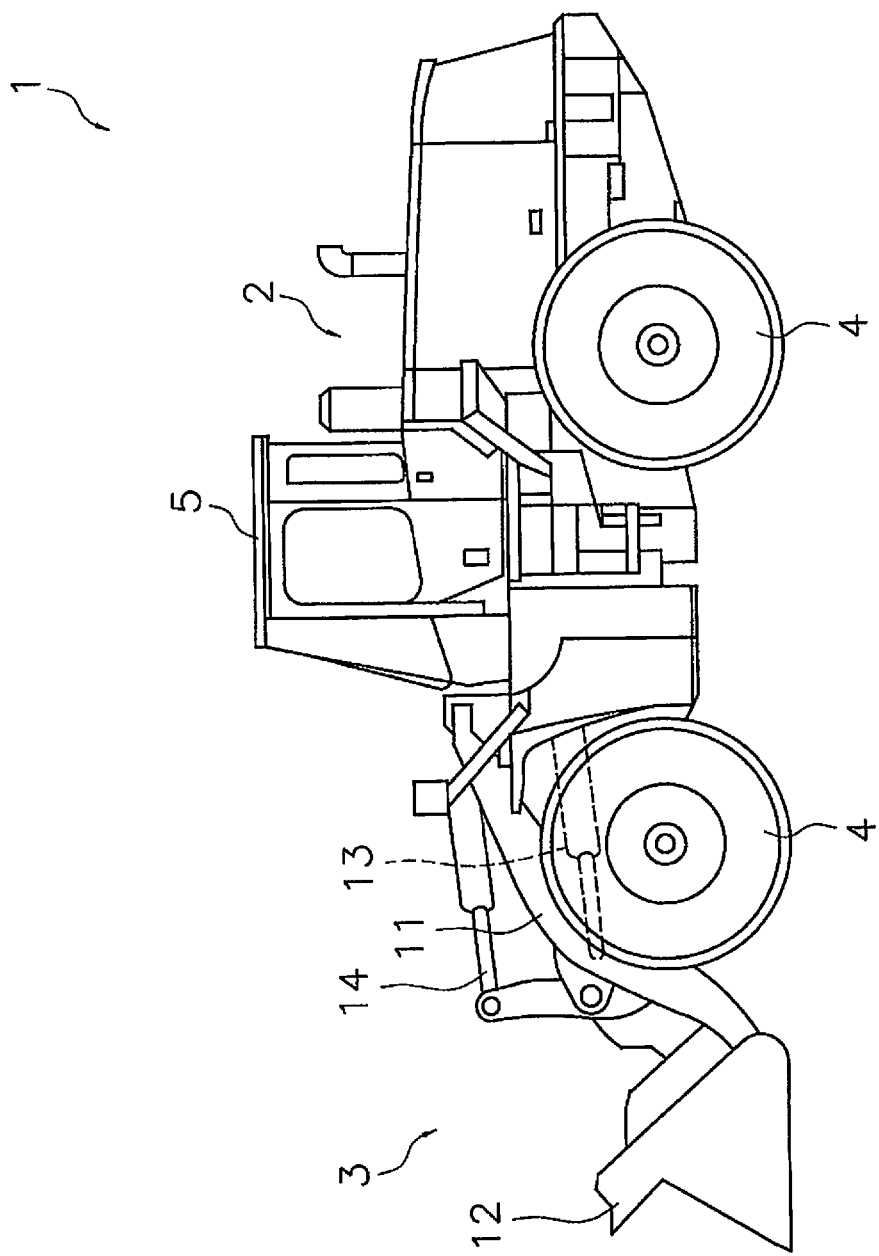
FIG. 1 is a side view of a work vehicle according to an embodiment.

Hereinafter, a work vehicle 1 according to an embodiment of the present invention will be described using the drawings. FIG. 1 is a side view of the work vehicle 1. The work vehicle 1 is a wheel loader. The work vehicle 1 includes a vehicle body 2, a work implement 3, a plurality of traveling wheels 4, and a cab 5. The work implement 3 is attached to the front of the vehicle body 2. The work implement 3 includes a boom 11, a bucket 12, a lift cylinder 13 and a bucket cylinder 14.

The boom 11 is rotatably attached to the vehicle body 2. The boom 11 is driven by the lift cylinder 13. The bucket 12 is rotatably attached to the boom 11. The bucket 12 is moved up and down by the bucket cylinder 14. The cab 5 is disposed on the vehicle body 2. The plurality of traveling wheels 4 are rotatably attached to the vehicle body 2.

Figure 2:
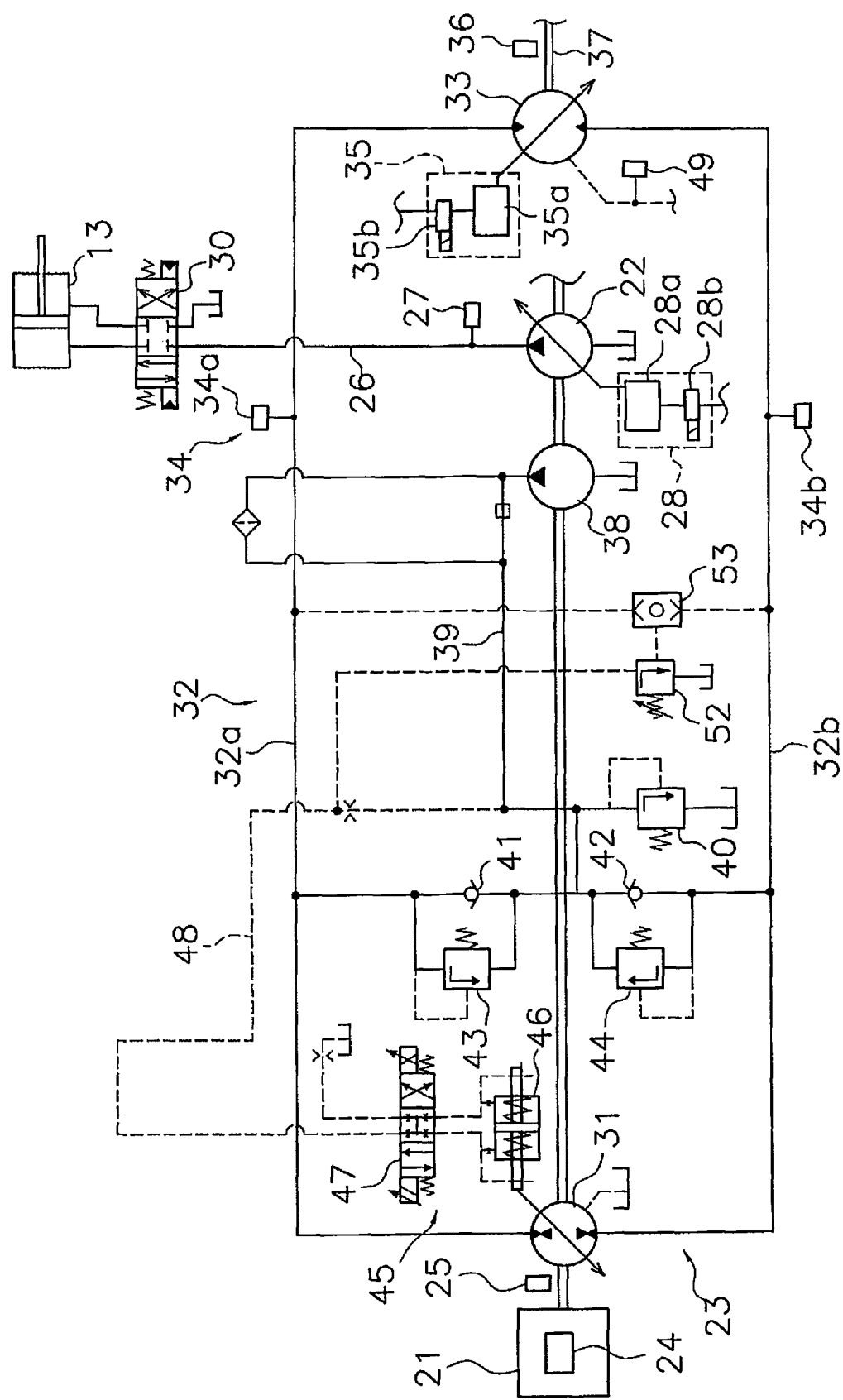
FIG. 2 is a block diagram showing a configuration of a drive system of the work vehicle.

FIG. 2 is a block diagram showing a configuration of a drive system mounted on work vehicle 1. The work vehicle 1 includes an engine 21, a work implement pump 22, and a hydrostatic transmission (hereinafter referred to as "HST") 23. The engine 21 is, for example, a diesel engine.

A fuel injector 24 is connected to the engine 21. The fuel injector 24 controls the amount of fuel injection to the engine 21 to control the output torque of the engine 21 (hereinafter referred to as "engine torque") and the rotational speed. The actual rotational speed of the engine 21 is detected by an engine speed sensor 25. The engine speed sensor 25 outputs a signal indicative of the actual rotational speed of the engine 21.

The work implement pump 22 is connected to the engine 21. The work implement pump 22 is driven by the engine 21 to discharge hydraulic fluid. The hydraulic fluid discharged from the work implement pump 22 is supplied to the lift cylinder 13 via the work implement hydraulic circuit 26. Thereby, the work implement 3 is driven. The discharge pressure of the work implement pump 22 is detected by a work implement pump pressure sensor 27. The work implement pump pressure sensor 27 outputs a signal indicative of the discharge pressure of the work implement pump 22.

The work implement pump 22 is a variable displacement hydraulic pump. A pump displacement control device 28 is connected to the work implement pump 22. The pump displacement control device 28 controls the displacement of the work implement pump 22. The pump displacement control device 28 includes a servo piston 28a and a pump control valve 28b. The servo piston 28a is connected to the work implement pump 22. The displacement of the work implement pump 22 is changed by the servo piston 28a changing the tilt angle of the work implement pump 22. The pump control valve 28b controls the hydraulic pressure supplied to the servo piston 28a to control the operation of the servo piston 28a. The work implement pump 22 may be a fixed displacement hydraulic pump.

A work implement control valve 30 is disposed in the work implement hydraulic circuit 26. The work implement control valve 30 controls the flow rate of the hydraulic fluid supplied to the lift cylinder 13 in accordance with the pilot pressure applied to the work implement control valve 30. Although not shown, the work implement control valve 30 may control the flow rate of the hydraulic fluid supplied to the bucket cylinder 14. The flow rate of the hydraulic fluid means the amount of hydraulic fluid supplied per unit time. The work implement control valve 30 is not limited to the hydraulic pilot-operated control valve, and may be an electromagnetic control valve that is electrically controlled.

The HST 23 includes a traveling pump 31, a driving hydraulic circuit 32, and a traveling motor 33. The traveling pump 31 is connected to the engine 21. The traveling pump 31 discharges hydraulic fluid by being driven by the engine 21. The traveling pump 31 is a variable displacement hydraulic pump. The hydraulic fluid discharged from the traveling pump 31 is sent to the traveling motor 33 through the driving hydraulic circuit 32.

The driving hydraulic circuit 32 connects the traveling pump 31 and the traveling motor 33. The driving hydraulic circuit 32 includes a first drive circuit 32a and a second drive circuit 32b. The first drive circuit 32a connects one port of the traveling pump 31 and one port of the traveling motor 33. The second drive circuit 32b connects the other port of the traveling pump 31 and the other port of the traveling motor 33. The traveling pump 31, the traveling motor 33, the first drive circuit 32a, and the second drive circuit 32b constitute a closed circuit.

The traveling motor 33 is driven in one direction (for example, the forward direction) by being supplied from the traveling pump 31 to the traveling motor 33 via the first drive circuit 32a. In this case, the hydraulic fluid returns from the traveling motor 33 to the traveling pump 31 via the second drive circuit 32b. Further, the hydraulic fluid is supplied from the traveling pump 31 to the traveling motor 33 via the second drive circuit 32b, whereby the traveling motor 33 is driven in the other direction (for example, the reverse direction). In this case, the hydraulic fluid returns from the traveling motor 33 to the traveling pump 31 via the first drive circuit 32a.

The driving hydraulic circuit 32 is provided with a drive circuit pressure sensor 34. The drive circuit pressure sensor 34 detects the pressure of the hydraulic fluid supplied to the traveling motor 33 via the first drive circuit 32a or the second drive circuit 32b. Specifically, the drive circuit pressure sensor 34 includes a first circuit pressure sensor 34a and a second circuit pressure sensor 34b.

The first circuit pressure sensor 34a detects the hydraulic pressure of the first drive circuit 32a. The second circuit pressure sensor 34b detects the hydraulic pressure of the second drive circuit 32b. The first circuit pressure sensor 34a outputs a signal indicative of the hydraulic pressure of the first drive circuit 32a. The second circuit pressure sensor 34b outputs a signal indicative of the hydraulic pressure of the second drive circuit 32b.

A temperature sensor 49 is provided with the driving hydraulic circuit 32. The temperature sensor 49 detects the temperature of the hydraulic fluid supplied to the traveling motor 33. The temperature sensor 49 outputs a signal indicative of the temperature of the hydraulic fluid supplied to the traveling motor 33.

The traveling motor 33 is a variable displacement hydraulic motor. The traveling motor 33 is driven by the hydraulic fluid discharged from the traveling pump 31 to generate a driving force for traveling. A motor displacement control device 35 is connected to the traveling motor 33. The motor displacement control device 35 controls the displacement of the traveling motor 33. The motor displacement control device 35 includes a motor cylinder 35a and a motor control valve 35b.

The motor cylinder 35a is connected to the traveling motor 33. The motor cylinder 35a is driven by hydraulic pressure to change the tilt angle of the traveling motor 33. The motor control valve 35b is an electromagnetic control valve controlled based on a command signal input to the motor control valve 35b. The motor control valve 35b operates the motor cylinder 35a to change the displacement of the traveling motor 33.

The traveling motor 33 is connected to the drive shaft 37. The drive shaft 37 is connected to the traveling wheels 4 described above via an axle (not shown). The rotation of the traveling motor 33 is transmitted to the traveling wheels 4 via the drive shaft 37. Thereby, the work vehicle 1 travels.

The work vehicle 1 is provided with a vehicle speed sensor 36. The vehicle speed sensor 36 detects the vehicle speed. The vehicle speed sensor 36 outputs a signal indicative of the vehicle speed. For example, the vehicle speed sensor 36 detects the vehicle speed by detecting the rotational speed of the drive shaft 37.

HST 23 includes a charge pump 38 and a charge circuit 39. The charge pump 38 is a fixed displacement hydraulic pump. The charge pump 38 is connected to the engine 21. The charge pump 38 is driven by the engine 21 to supply hydraulic fluid to the driving hydraulic circuit 32.

The charge circuit 39 is connected to the charge pump 38. The charge circuit 39 is connected to the first drive circuit 32a via a first check valve 41. The charge circuit 39 is connected to the second drive circuit 32b via a second check valve 42.

The charge circuit 39 is connected to the first drive circuit 32a via a first relief valve 43. The first relief valve 43 is opened when the hydraulic pressure of the first drive circuit 32a becomes larger than a predetermined relief pressure. The charge circuit 39 is connected to the second drive circuit 32b via a second relief valve 44. The second relief valve 44 is opened when the hydraulic pressure of the second drive circuit 32b becomes larger than a predetermined relief pressure.

A charge relief valve 40 is provided in the charge circuit 39. The charge relief valve 40 is opened when the hydraulic pressure of the charge circuit 39 becomes larger than a predetermined relief pressure. Thereby, the hydraulic pressure of the charge circuit 39 is limited so as not to exceed the predetermined relief pressure.

A pump displacement control device 45 is connected to the traveling pump 31. The pump displacement control device 45 controls the displacement of the traveling pump 31. The displacement of the hydraulic pump means the discharge amount (cc/rev) of hydraulic fluid per one rotation. Further, the pump displacement control device 45 controls the discharge direction of the traveling pump 31. The pump displacement control device 45 includes a pump control cylinder 46 and a pump control valve 47.

The pump control cylinder 46 is connected to the traveling pump 31. The pump control cylinder 46 is hydraulically driven to change the tilt angle of the traveling pump 31. Thus, the pump control cylinder 46 changes the displacement of the traveling pump 31. The pump control cylinder 46 is connected to the charge circuit 39 via a pump pilot circuit 48.

The pump control valve 47 is an electromagnetic control valve controlled based on a command signal input to the pump control valve 47. The pump control valve 47 switches the supply direction of the hydraulic fluid to the pump control cylinder 46. The pump control valve 47 switches the discharge direction of the traveling pump 31 by switching the supply direction of the hydraulic fluid to the pump control cylinder 46. Thereby, the driving direction of the traveling motor 33 is changed, and the forward and reverse of the work vehicle 1 are switched.

The pump control valve 47 also controls the pressure of hydraulic fluid supplied to the pump control cylinder 46 via the pump pilot circuit 48. Specifically, the pump control valve 47 adjusts the tilt angle of the traveling pump 31 by changing the pressure of the hydraulic fluid supplied to the pump control cylinder 46. Thereby, the displacement of the traveling pump 31 is controlled.

The pump pilot circuit 48 is connected to the hydraulic fluid tank via the cut-off valve 52. The pilot ports of the cut-off valve 52 are connected to the first drive circuit 32a and the second drive circuit 32b via a shuttle valve 53. The shuttle valve 53 introduces the larger one of the hydraulic pressure of the first drive circuit 32a and the hydraulic pressure of the second drive circuit 32b (hereinafter referred to as "drive circuit pressure") into the pilot port of the cut-off valve 52.

The cut-off valve 52 causes the pump pilot circuit 48 to communicate with the hydraulic fluid tank when the drive circuit pressure becomes equal to or higher than a predetermined cut-off pressure. As a result, the hydraulic pressure of the pump pilot circuit 48 is reduced, whereby the displacement of the traveling pump 31 is reduced. As a result, an increase in drive circuit pressure can be suppressed.

Figure 3:
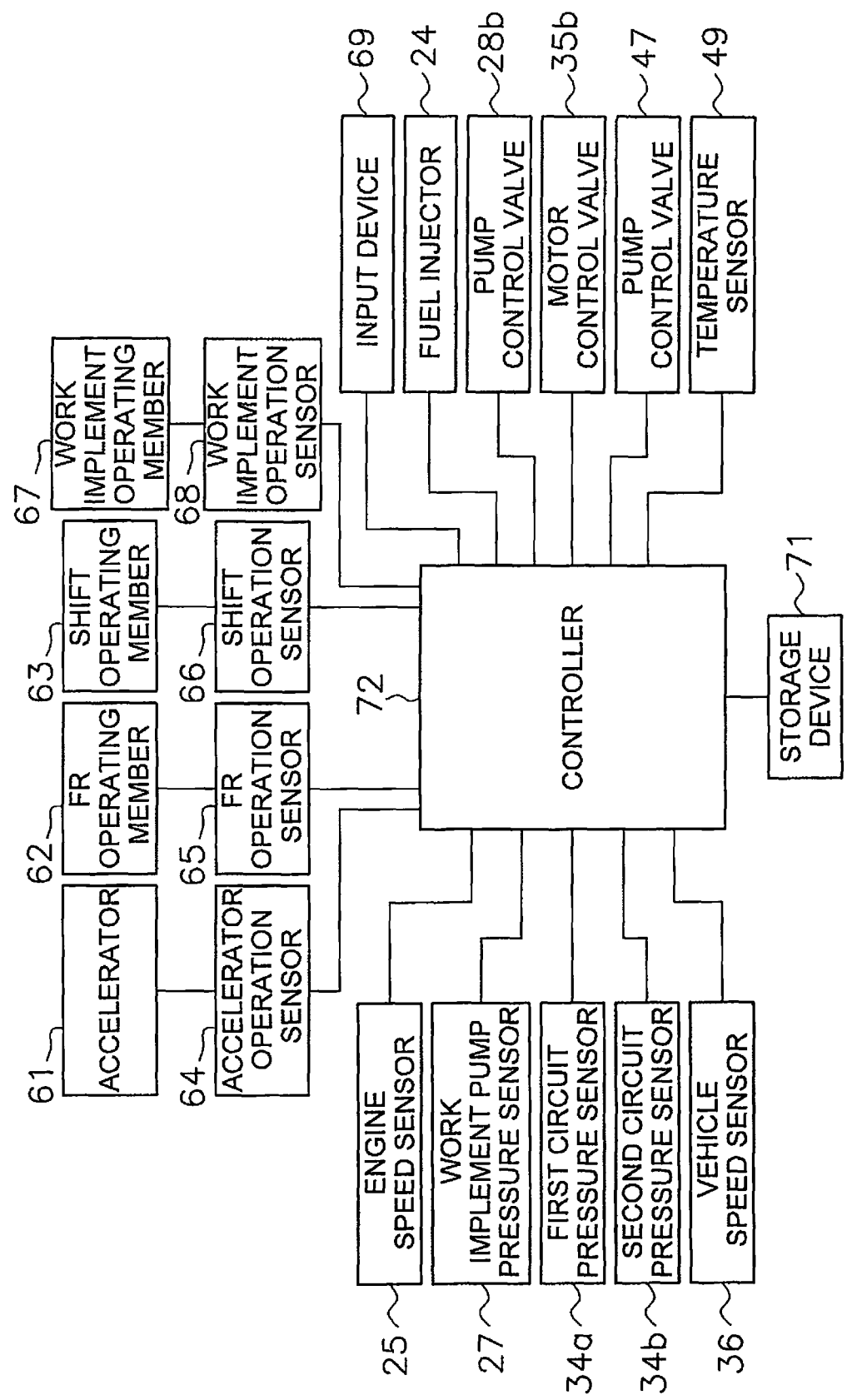
FIG. 3 is a block diagram showing a configuration of a control system of the work vehicle.

FIG. 3 is a schematic view showing a control system of the work vehicle 1. As shown in FIG. 3, the work vehicle 1 includes an accelerator 61, an FR operating member 62, and a shift operating member 63. The accelerator 61, the FR operating member 62, and the shift operating member 63 are disposed to be operable by the operator. The accelerator 61, the FR operating member 62, and the shift operating member 63 are disposed in the cab 5.

The accelerator 61 is, for example, an accelerator pedal. However, the accelerator 61 may be another member such as a lever or a switch. The accelerator 61 is connected to an accelerator operation sensor 64. The accelerator operation sensor 64 is, for example, a position sensor that detects the position of the accelerator 61. The accelerator operation sensor 64 outputs a signal indicative of an operation amount of the accelerator 61 (hereinafter referred to as "accelerator operation amount"). The accelerator operation amount is, for example, represented by a ratio when the state in which the accelerator 61 is operated fully open is 100%. As described later, the operator can control the vehicle speed and the traction force by adjusting the accelerator operation amount.

The FR operating member 62 is, for example, an FR lever. However, the FR operating member 62 may be another member such as a switch. The FR operating member 62 is switched between a forward position, a reverse position and a neutral position. The FR operating member 62 is connected to the FR operation sensor 65. The FR operation sensor 65 is, for example, a position sensor that detects the position of the FR operating member 62. The FR operation sensor 65 outputs a signal indicative of the position of the FR operating member 62. The operator can switch between forward and reverse of the work vehicle 1 by operating the FR operating member 62.

The shift operating member 63 is, for example, a dial switch. However, the shift operating member 63 may be another member such as a lever. The shift operating member 63 is connected to the shift operation sensor 66. The shift operation sensor 66 is, for example, a position sensor that detects the position of the shift operating member 63 (hereinafter referred to as "shift position"). The shift operation sensor 66 outputs a signal indicative of the shift position. The shift position includes, for example, the positions of first to fourth speeds. However, the shift position may include a position faster than the fourth speed. Alternatively, the shift position may be from the first speed to a position slower than the fourth speed.

Figure 4:
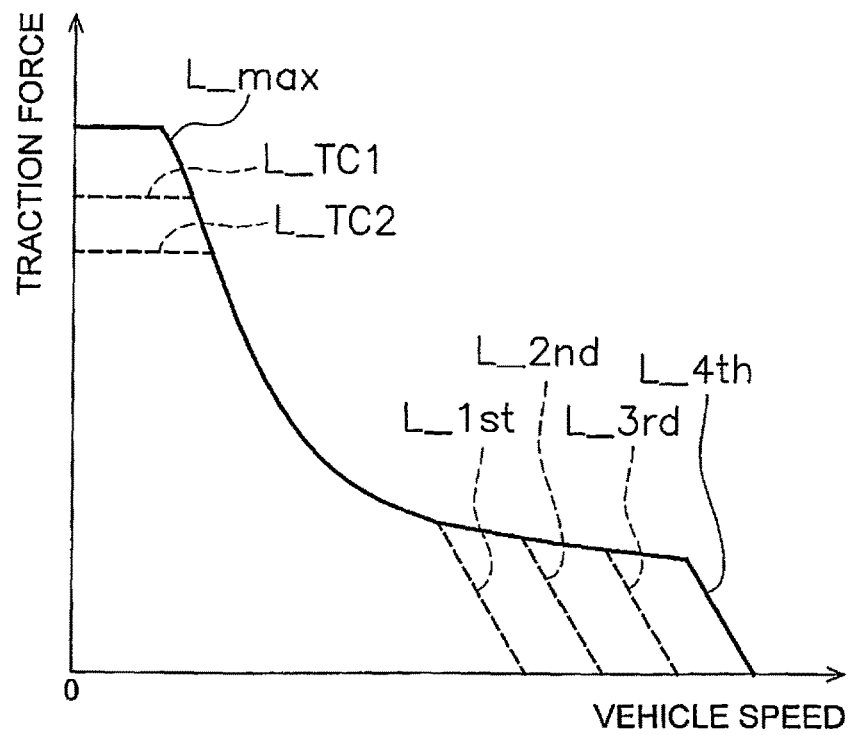
FIG. 4 is a diagram showing vehicle speed-traction force characteristics of the work vehicle.

FIG. 4 is a diagram showing a vehicle speed-traction force characteristic of the work vehicle 1. As shown in FIG. 4, the operator can select a shift pattern (L_1st to L_4th) that defines the maximum vehicle speed by operating the shift operating member 63.

The work vehicle 1 includes a work implement operating member 67. The work implement operating member 67 is, for example, a work implement lever. However, the work implement operating member 67 may be another member such as a switch. A pilot pressure corresponding to the operation of the work implement operating member 67 is applied to the work implement control valve 30. The work implement operating member 67 is connected to a work implement operation sensor 68. The work implement operation sensor 68 is, for example, a pressure sensor. The work implement operation sensor 68 detects the operation amount of the work implement operating member 67 (hereinafter referred to as "work implement operation amount") and the operation direction, and outputs signals indicative of the work implement operation amount and the operation direction. When the work implement control valve 30 is not a pressure proportional control valve but an electromagnetic proportional control valve, the work implement operation sensor 68 is a position sensor that electrically detects the position of the work implement operating member 67. The operator can operate the work implement 3 by operating the work implement operating member 67. For example, the operator can raise or lower the bucket 12 by operating the work implement operating member 67.

The work vehicle 1 includes an input device 69. The input device 69 is, for example, a touch panel. However, the input device 69 is not limited to the touch panel, and may be another device such as a switch. The operator can perform various settings of the work vehicle 1 by operating the input device 69. For example, the input device 69 can set traction control. As shown in FIG. 4, The traction control is a feature that allows the maximum traction force to be selected from a plurality of traction levels.

The plurality of traction levels include a first level and a second level. At the first level, the maximum traction force is limited to a value less than the normal maximum traction force where traction control is disabled. At the second level, the maximum traction force is limited to a value smaller than the maximum traction force at the first level.

In FIG. 4, L_max represents the vehicle speed-traction force characteristic of the work vehicle 1 at the normal time when the traction control is disabled. L_TC1 shows the vehicle speed-traction force characteristic in the traction control at the first level. L_TC2 shows the vehicle speed-traction force characteristic in the traction control at the second level.

As shown in FIG. 3, the work vehicle 1 includes a storage device 71 and a controller 72. The storage device 71 includes, for example, a memory and an auxiliary storage device. The storage device 71 may be, for example, a RAM or a ROM. The storage device 71 may be a semiconductor memory or a hard disk. The storage device 71 is an example of a non-transitory computer readable recording medium. The storage device 71 stores computer instructions that can be executed by a processor and control the work vehicle 1.

The controller 72 includes, for example, a processor such as a CPU. The controller 72 is communicably connected to the above-described sensor, the input device 69, and the storage device 71. The controller 72 is communicably connected to the various sensors described above, the input device 69, and the storage device 71 in a wired or wireless manner. The controller 72 acquires various data by receiving signals from the sensor, the input device 69, and the storage device 71. The controller 72 is programmed to control the work vehicle 1 based on the acquired data. The controller 72 may be configured by a plurality of controllers separate from one another.

The controller 72 is communicably connected to the control valves 35b and 47 and the fuel injector 24 described above in a wired or wireless manner. The controller 72 controls the control valves 35b and 47 and the fuel injector 24 by outputting command signals to the control valves 35b and 47 and the fuel injector 24.

Specifically, the controller 72 controls the engine torque and the engine speed by outputting a command signal to the fuel injector 24. The controller 72 controls the displacement of the traveling motor 33 by outputting a command signal to the motor control valve 35b. The controller 72 controls the displacement of the traveling pump 31 by outputting a command signal to the pump control valve 47. The controller 72 controls the transmission ratio of the HST 23 by controlling the displacement of the traveling pump and the displacement of the traveling motor so that the vehicle speed-traction force characteristic as shown in FIGS. 4 and 5 is realized.

Next, control of the work vehicle 1 by the controller 72 will be described. In the work vehicle 1 according to the present embodiment, the controller 72 determines a target rotational speed of the engine 21 (hereinafter referred to as "target engine speed") based on the accelerator operation amount and the work implement operation amount. The operator can increase the engine speed by operating the work implement operating member 67 without operating the accelerator 61. Further, even if the work implement operating member 67 and the accelerator 61 are simultaneously operated, the traveling performance of the vehicle can be adjusted by the accelerator 61 without being affected by the operation of the work implement operating member 67.

Figure 5:
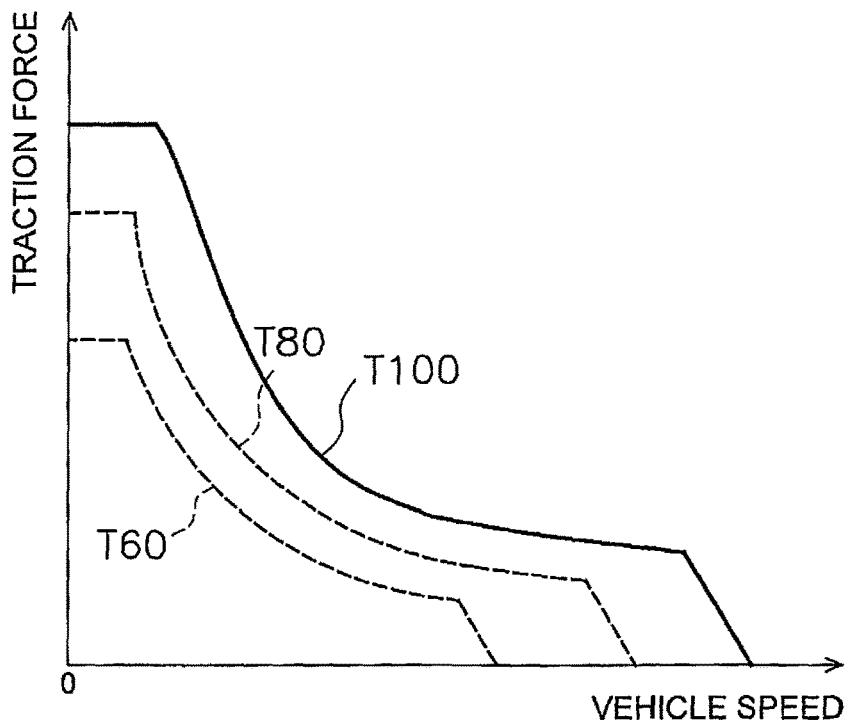
FIG. 5 is a view showing an example of a vehicle speed-traction force characteristic which is changed according to the operation of an accelerator.

FIG. 5 is a view showing an example of a vehicle speed-traction force characteristic which is changed according to the operation of the accelerator 61 by the operator. In FIG. 5, T100 represents the vehicle speed-traction force characteristic when the accelerator operation amount is 100%. T80 indicates the vehicle speed-traction force characteristic when the accelerator operation amount is 80%. T60 shows the vehicle speed-traction force characteristic when the accelerator operation amount is 60%. In the work vehicle 1 according to the present embodiment, even when the work implement operating member 67 and the accelerator 61 are simultaneously operated, traveling performance (vehicle speed-traction force characteristic) can be obtained according to the accelerator operation amount.

Figure 6:
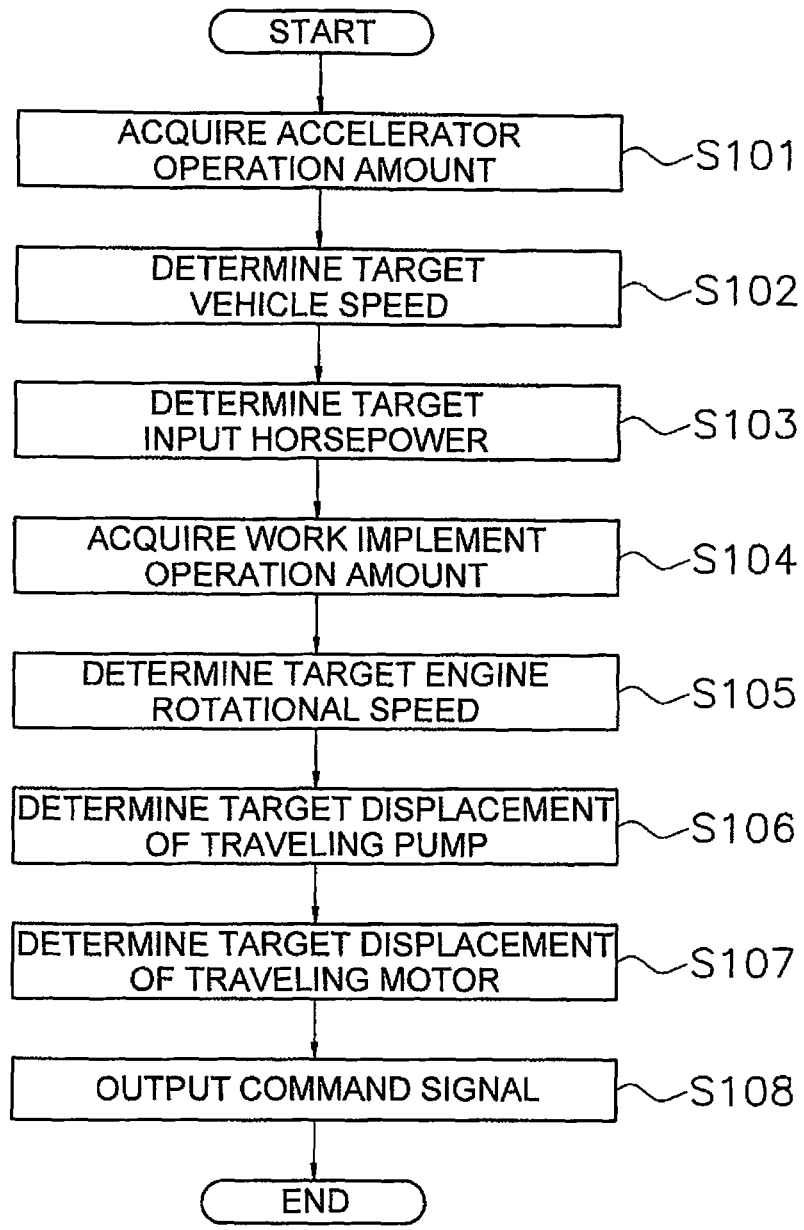
FIG. 6 is a flow chart illustrating processing executed by the controller.

The processing executed by the controller 72 will be described below. FIG. 6 is a flowchart showing the process executed by the controller 72. In the following description, control when the work vehicle 1 moves forward will be described. However, similar control may be performed when the work vehicle 1 moves backward.

As shown in FIG. 6, in S101, the controller 72 acquires an accelerator operation amount. The controller 72 acquires the accelerator operation amount in accordance with a signal from the accelerator operation sensor 64.

Figure 7:
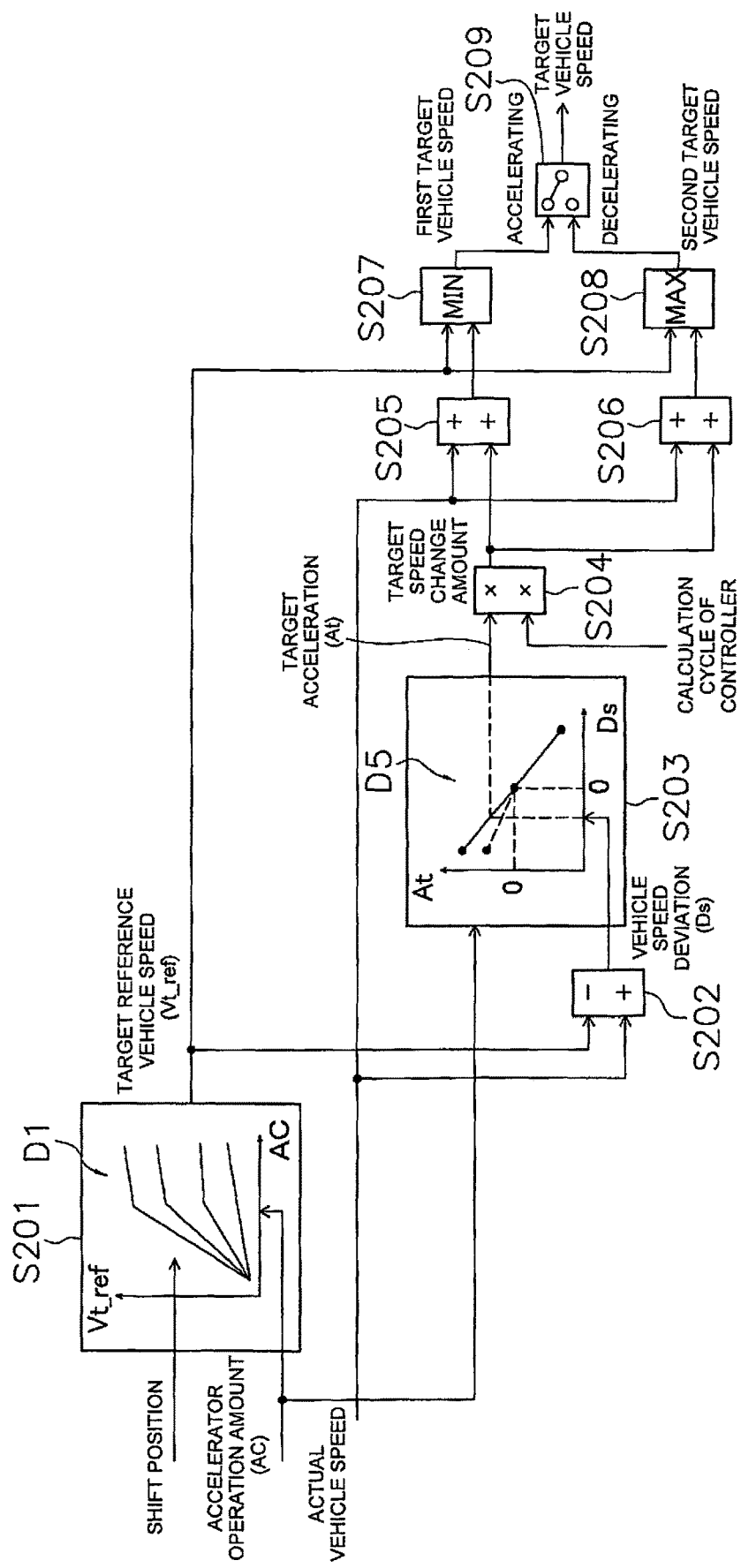
FIG. 7 is a diagram showing processing for determining a target vehicle speed from the operation amount of an accelerator.

In step S102, the controller 72 determines a target vehicle speed. The controller 72 determines the target vehicle speed from the accelerator operation amount. FIG. 7 shows a process for determining the target vehicle speed from the accelerator operation amount.

As shown in FIG. 7, in step S201, the controller 72 determines a target reference vehicle speed from the accelerator operation amount and the shift position. The target reference vehicle speed is a vehicle speed that is set as the target achieved vehicle speed when the work vehicle 1 travels on a flat ground. The storage device 71 stores reference vehicle speed data D1 that defines the relationship between the accelerator operation amount and the target reference vehicle speed. In the reference vehicle speed data D1, the target reference vehicle speed is increased according to the increase of the accelerator operation amount. The reference vehicle speed data D1 defines the relationship between the accelerator operation amount and the target reference vehicle speed for each shift position. In the reference vehicle speed data D1, even if the accelerator operation amount is the same, the target reference vehicle speed increases as the shift position is on the high speed side. The controller 72 refers to the reference vehicle speed data D1 to determine the target reference vehicle speed corresponding to the accelerator operation amount and the shift position.

In step S202, the controller 72 calculates the vehicle speed deviation. The vehicle speed deviation is the difference between the target reference vehicle speed and the actual vehicle speed. In step S203, the controller 72 calculates a target acceleration. The controller 72 calculates the target acceleration from the vehicle speed deviation and the accelerator operation amount. Specifically, the controller 72 calculates the target acceleration corresponding to the vehicle speed deviation with reference to the acceleration data D5. The acceleration data D5 defines the relationship between the vehicle speed deviation and the target acceleration. In the acceleration data D5, the target acceleration decreases as the vehicle speed deviation increases. The controller 72 changes the acceleration data D5 in accordance with the accelerator operation amount. The controller 72 changes the acceleration data D5 such that the target acceleration increases as the accelerator operation amount increases, although the vehicle speed deviation is the same. In addition, that the vehicle speed deviation is negative means that the work vehicle 1 is accelerating. That the vehicle speed deviation is positive means that the work vehicle 1 is decelerating. A positive value for the target acceleration means acceleration, and a negative value for the target acceleration means deceleration.

In step S204, the controller 72 calculates a target speed change amount from the target acceleration. The controller 72 multiplies the target acceleration by the calculation cycle of the controller 72 to calculate the target speed change amount.

In step S205 and step S206, the controller 72 adds the target speed change amount to the actual vehicle speed. In step S207, the controller 72 selects the smaller one (first target vehicle speed) of the target reference vehicle speed and the value obtained by adding the target speed change amount to the actual vehicle speed. In step S208, the controller 72 selects the larger one (second target vehicle speed) of the target reference vehicle speed and the value obtained by adding the target speed change amount to the actual vehicle speed.

In step S209, the controller 72 determines the target vehicle speed according to whether the work vehicle 1 is accelerating or decelerating. The controller 72 determines that the work vehicle 1 is accelerating when the actual vehicle speed is lower than the target reference vehicle speed. Further, when the actual vehicle speed is larger than the target reference vehicle speed, the controller 72 determines that the work vehicle 1 is decelerating. The controller 72 determines the first target vehicle speed as the target vehicle speed during acceleration, and determines the second target vehicle speed as the target vehicle speed during deceleration. When the target vehicle speed is a negative value, the controller 72 sets the target vehicle speed to zero.

Next, as shown in FIG. 6, in step S103, the controller 72 determines the target input horsepower to the HST 23. The target input horsepower to the HST 23 means the horsepower distributed to the HST 23 of the output horsepower of the engine 21. The controller 72 determines the target input horsepower from the accelerator operation amount.

Figure 8:
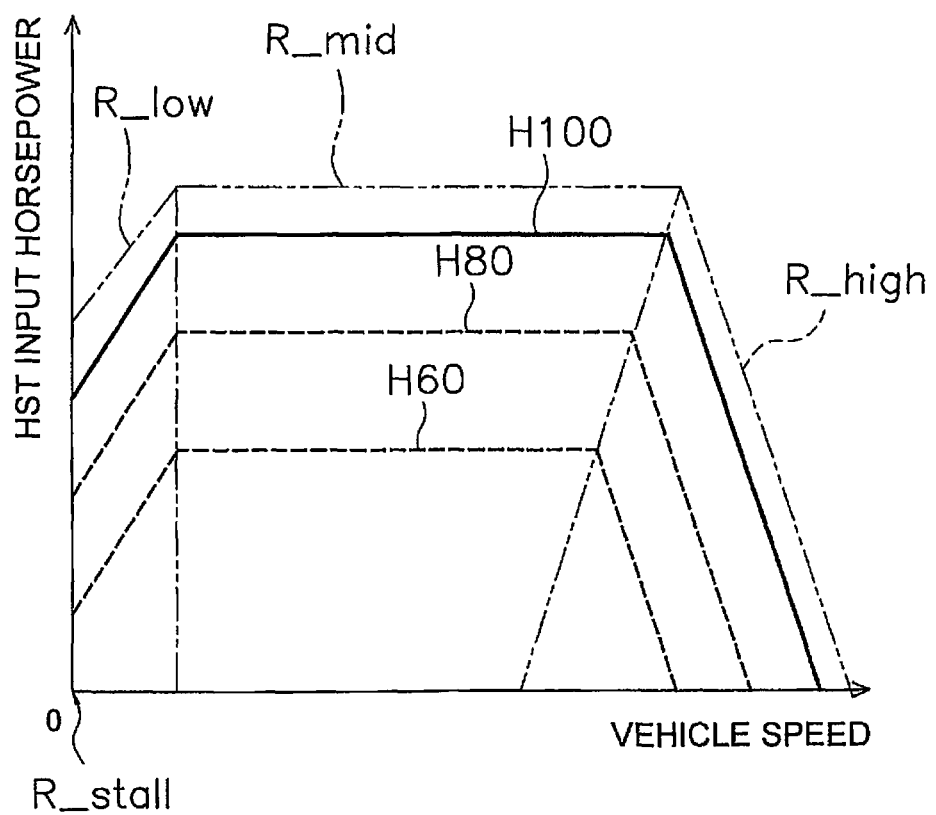
FIG. 8 is a diagram showing vehicle speed-input horsepower characteristics of the work vehicle.

FIG. 8 is a diagram showing a vehicle speed-HST input horsepower characteristic of the work vehicle 1 according to the present embodiment. In FIG. 8, H100 represents the vehicle speed-HST input horsepower characteristic when the accelerator operation amount is 100%. H80 represents the vehicle speed-HST input horsepower characteristic when the accelerator operation amount is 80%. H60 shows the vehicle speed-HST input horsepower characteristic when the accelerator operation amount is 60%.

As shown in FIG. 8, the controller 72 determines the target input horsepower to the HST 23 from the accelerator operation amount so that traveling performance (vehicle speed-HST input horsepower characteristic) corresponding to the accelerator operation amount can be obtained. The controller 72 determines the target input horsepower to the HST 23 in stalling (R_stall), the low vehicle speed range (R_low), the middle vehicle speed range (R_mid), and the high vehicle speed range (R_high) according to the target vehicle speed.

Figure 9:
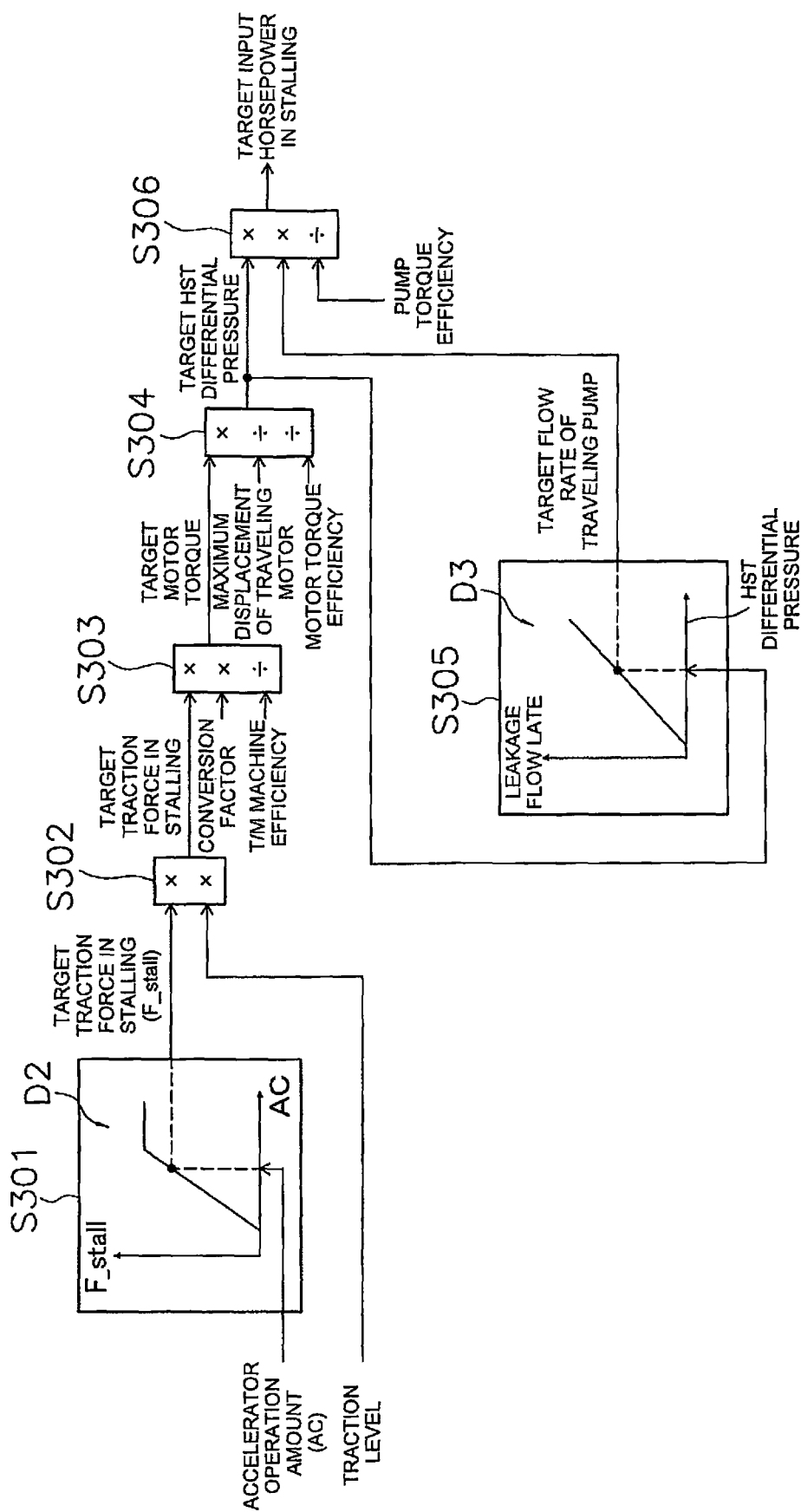
FIG. 9 is a diagram showing processing for determining a target input horsepower in stalling.

FIG. 9 is a diagram showing processing for determining the target input horsepower to the HST 23 in stalling. As shown in FIG. 9, in step S301, the controller 72 determines a target traction force in stalling from the accelerator operation amount. The storage device 71 stores target traction data D2 that defines the relationship between the accelerator operation amount and the target traction force in stalling. The target traction data D2 defines the relationship between the accelerator operation amount and the target traction force in stalling in a normal state in which the above-described function such as traction control is not executed. The target traction data D2 defines the target traction force in stalling for the accelerator operation amount ranging from 0 to 100%. In the target traction data D2, the target traction force increases as the accelerator operation amount increases. The controller 72 refers to the target traction data D2 to determine the target traction force in stalling corresponding to the accelerator operation amount.

In step S302, the controller 72 determines the target traction force in stalling at each traction level by multiplying the target traction force in stalling determined in step S301 by the ratio according to the traction level. The ratio is 1 under the normal time where the traction control is not performed.

In step S303, the controller 72 converts the target traction force in stalling determined in step S302 into a target motor torque. The controller 72 calculates the target motor torque by multiplying the target traction force by a predetermined conversion factor and dividing by the transmission machine efficiency. The predetermined conversion factor is a factor for converting the traction force of the work vehicle 1 into a torque at the output shaft of the HST 23. The transmission machine efficiency is the transmission efficiency from the output shaft of the HST 23 to the traveling wheels 4.

In step S304, the controller 72 determines a target HST differential pressure from the target motor torque. The HST differential pressure is a difference between the hydraulic pressure of the first drive circuit 32a and the hydraulic pressure of the second drive circuit 32b. The controller 72 calculates the target HST differential pressure by dividing the target motor torque by the maximum displacement of the traveling motor 33 and dividing it by the torque efficiency of the traveling motor 33.

In step S305, the controller 72 determines the target flow rate of the traveling pump 31 from the target HST differential pressure. The controller 72 determines the leakage flow rate of the hydraulic fluid from the target HST differential pressure, and determines the target flow rate of the traveling pump 31 from the leakage flow rate. The storage device 71 stores leakage flow rate data D3 that defines the relationship between the target HST differential pressure and the leakage flow rate of the hydraulic fluid in the driving hydraulic circuit 32 in stalling.

The leakage flow rate of the hydraulic fluid is the flow rate of hydraulic fluid leaking from the hydraulic equipment contained in HST23 and is correlated with the HST differential pressure. Therefore, the relationship between the HST differential pressure and the leakage flow rate of the hydraulic fluid in the driving hydraulic circuit 32 is previously obtained by experiment or simulation, and set as leakage flow rate data D10. For example, the leakage flow rate of the hydraulic fluid corresponds to the flow rate of traveling pump 31 when the traveling pump 31 is driven with traveling motor 33 stopped in HST 23.

The leakage flow rate in the data D3, in accordance with the increase of the target HST differential pressure, the leakage flow rate is increased. The controller 72 refers to the leakage flow rate data D3 to determine the leakage flow rate corresponding to the target HST differential pressure. In stalling, the leakage flow rate substantially matches the flow rate of the traveling pump 31. The controller 72 determines the leakage flow rate obtained from the leakage flow rate data D3 as the target flow rate of the traveling pump 31.

In step S306, the controller 72 determines the target input horsepower to the HST 23 in stalling from the target HST differential pressure and the target flow rate of the traveling pump 31. The controller 72 multiplies the target HST differential pressure by the target flow rate of the traveling pump 31 and divides it by the pump torque efficiency to determine the target input horsepower to the HST 23 in stalling.

Figure 10:
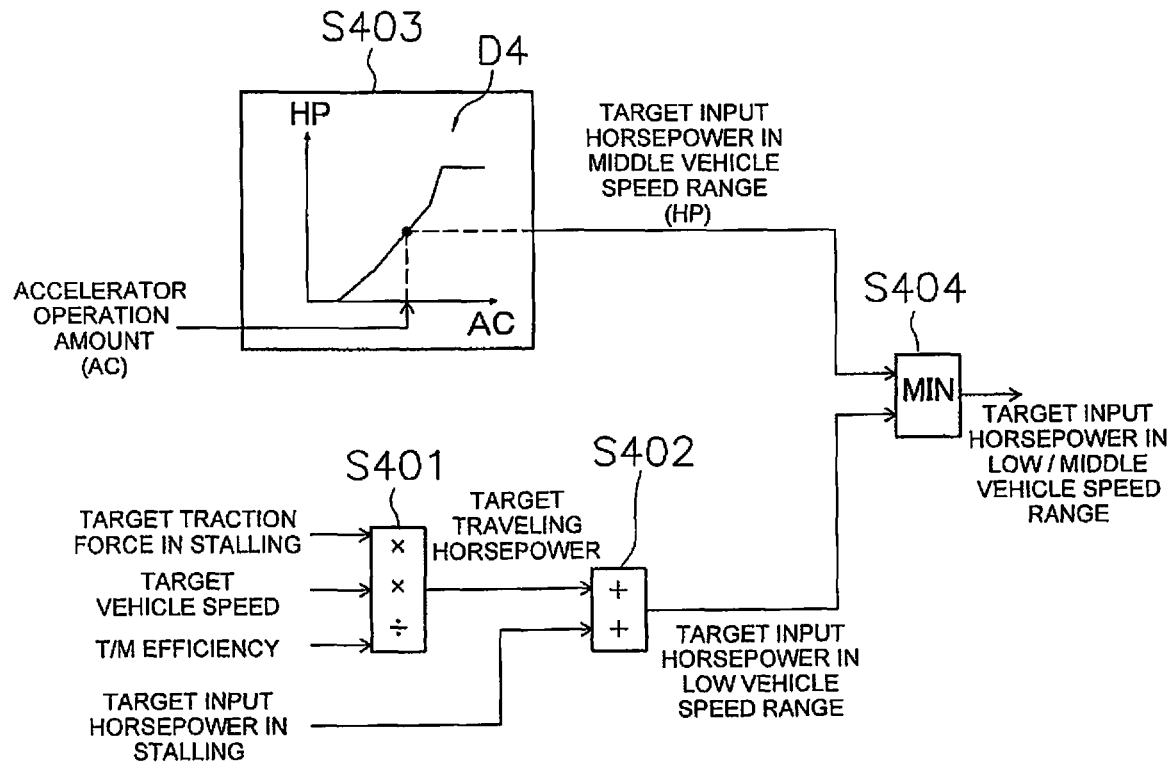
FIG. 10 is a diagram showing processing for determining the target input horsepower in a low vehicle speed range and a middle vehicle speed range.

FIG. 10 is a diagram showing processing for determining the target input horsepower to the HST 23 in the low vehicle speed range and the middle vehicle speed range. As shown in FIG. 10, in step S401, the controller 72 determines a target traveling horsepower from the target traction force in stalling and the target vehicle speed. The controller 72 determines the target traveling horsepower by multiplying the target traction force in stalling by the target vehicle speed and dividing by the transmission efficiency. The transmission efficiency is a transmission efficiency from the input shaft of the HST 23 to the traveling wheels 4.

In step S402, the controller 72 determines the target input horsepower to the HST 23 in the low vehicle speed range from the target traveling horsepower and the target input horsepower in stalling. The controller 72 determines the target input horsepower to the HST 23 in the low vehicle speed range by adding the target traveling horsepower to the target input horsepower in stalling.

In step S403, the controller 72 determines the target input horsepower to the HST 23 in the middle vehicle speed range from the accelerator operation amount. The storage device 71 stores target input horsepower data D4 that defines the relationship between the accelerator operation amount and the target input horsepower to the HST 23. In the target input horsepower data D4, the target input horsepower increases as the accelerator operation amount increases. The controller 72 refers to the target input horsepower data D4 to determine the target input horsepower in the middle vehicle speed range corresponding to the accelerator operation amount.

In step S404, the controller 72 determined the smaller one of the target input horsepower in the low vehicle speed range determined in step S402 and the target input horsepower in the middle vehicle speed range determined in step S403 as the target input horsepower to the HST 23 in the low/middle vehicle speed range.

Figure 11:
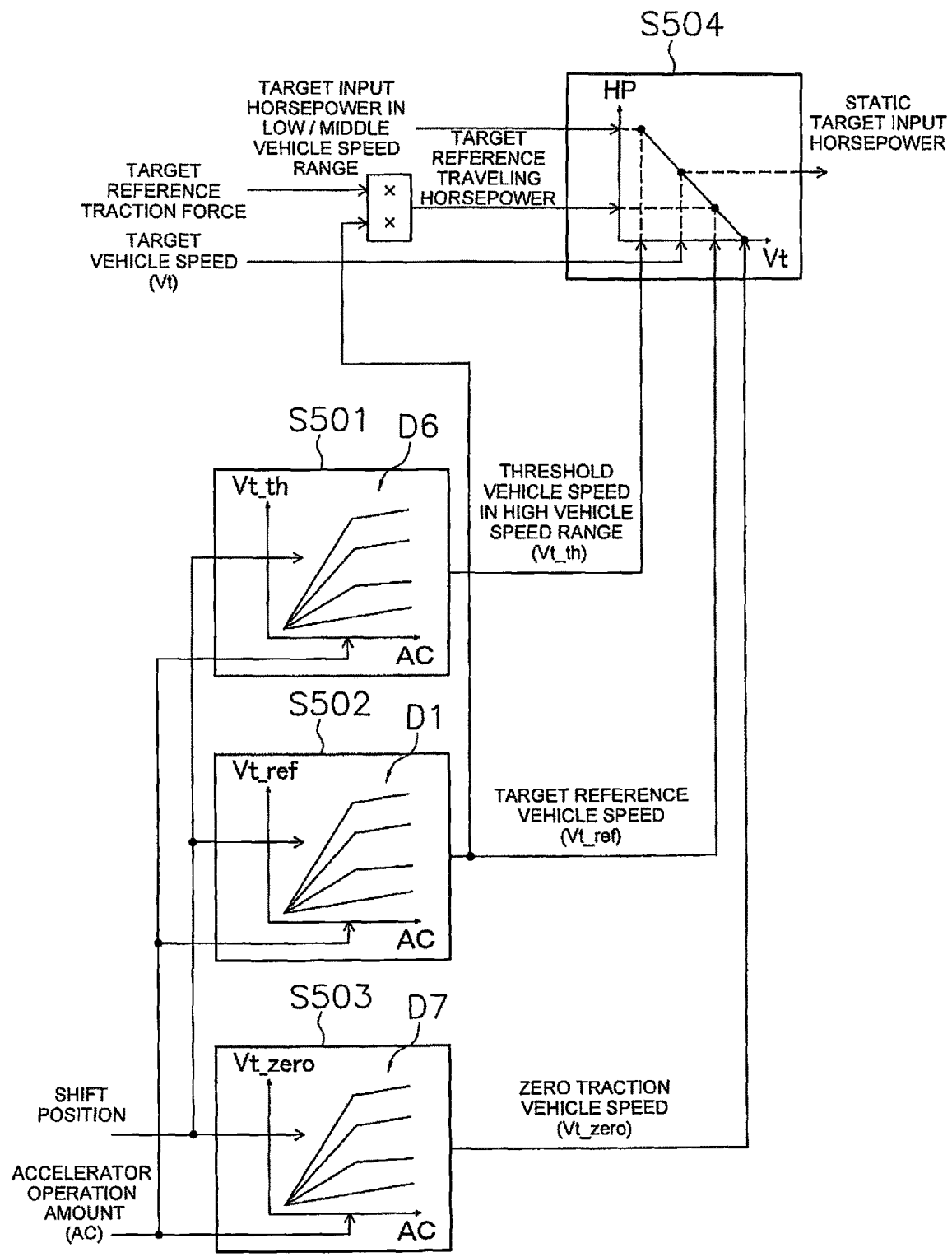
FIG. 11 is a diagram showing processing for determining the target input horsepower in a high vehicle speed range.

FIG. 11 is a diagram showing processing for determining the target input horsepower to the HST 23 in the high vehicle speed range. As shown in FIG. 11, in step S501, the controller 72 determines the threshold vehicle speed in the high vehicle speed range from the accelerator operation amount and the shift position. The threshold vehicle speed in the high vehicle speed range is a vehicle speed indicative of the boundary between the low/middle vehicle speed range and the high vehicle speed range. The storage device 71 stores threshold vehicle speed data D6 that defines the relationship between the accelerator operation amount and the threshold vehicle speed. In the threshold vehicle speed data D6, the threshold vehicle speed increases according to the increase of the accelerator operation amount. The threshold vehicle speed data D6 defines the relationship between the accelerator operation amount and the threshold vehicle speed for each shift position. Although the accelerator operation amount is the same, the threshold vehicle speed increases as the shift position is higher. The controller 72 refers to the threshold vehicle speed data D6 to determine the threshold vehicle speed corresponding to the accelerator operation amount and the shift position.

In step S502, the controller 72 determines the target reference vehicle speed from the accelerator operation amount and the shift position. The controller 72 determines the target reference vehicle speed corresponding to the accelerator operation amount and the shift position with reference to the reference vehicle speed data D1 described above.

In step S503, the controller 72 determines the zero traction vehicle speed from the accelerator operation amount and the shift position. The zero traction vehicle speed means the target vehicle speed when the traction force is zero, that is, when the traveling load is zero. The storage device 71 stores zero traction vehicle speed data D7 that defines the relationship between the accelerator operation amount and the zero traction vehicle speed. In the zero traction vehicle speed data D7, the zero traction vehicle speed increases in accordance with the increase in the accelerator operation amount. The zero traction vehicle speed data D7 defines the relationship between the accelerator operation amount and the zero traction vehicle speed for each shift position. Although the accelerator operation amount is the same, the zero traction vehicle speed increases as the shift position is higher. The controller 72 determines the zero traction vehicle speed corresponding to the accelerator operation amount and the shift position with reference to the zero traction vehicle speed data D7.

When the accelerator operation amount and the shift position are the same, the threshold vehicle speed data D6, the reference vehicle speed data D1, and the zero traction vehicle speed data D7 are set such that the target reference vehicle speed is greater than the threshold vehicle speed and lower than the zero traction vehicle speed.

In step S504, the controller 72 determines the static target input horsepower to the HST 23 from the target vehicle speed. When the target vehicle speed is equal to or less than the threshold vehicle speed, the controller 72 determines the above-described target input horsepower in the low/middle vehicle speed range as the static target input horsepower.

When the target vehicle speed is the target reference vehicle speed, the controller 72 determines the target reference traveling horsepower calculated by multiplying the target reference traction force by the target reference vehicle speed as the static target input horsepower. For example, the controller determines the target reference traction force from the weight of the work vehicle 1 and a predetermined coefficient. The weight of the work vehicle 1 and the predetermined coefficient are stored in the storage device 71.

The controller 72 sets the static target input horsepower to zero when the target vehicle speed is equal to or greater than the zero traction vehicle speed. When the target vehicle speed is a value between the threshold vehicle speed and the target reference vehicle speed, or a value between the target reference vehicle speed and the zero traction vehicle speed, the controller 72 determines the static target input horsepower to the HST 23 by linear interpolation.

Figure 12:
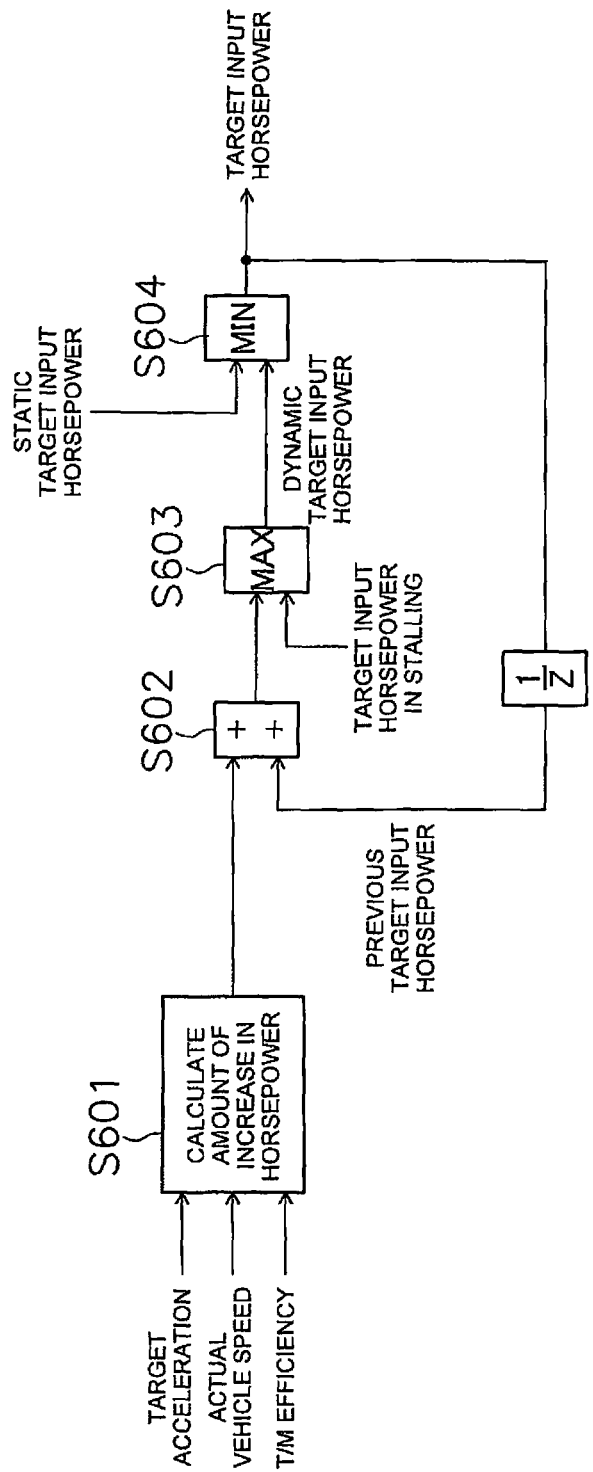
FIG. 12 is a diagram showing processing for determining the target input horsepower at a transition time.

The static target input horsepower mentioned above is the target input horsepower to HST 23 at steady state. At the time of transition due to the change of the accelerator operation amount, the controller 72 increases the target input horsepower to the HST 23 at a speed according to the accelerator operation amount within a range not exceeding the static target input horsepower. FIG. 12 is a diagram showing processing for determining the target input horsepower (dynamic target input horsepower) to the HST 23 at the time of transition.

As shown in FIG. 12, in step S601, the controller 72 determines the amount of increase in horsepower from the target acceleration described above, the actual vehicle speed, and the transmission efficiency. The amount of increase in horsepower means the amount of increase in input horsepower to HST 23 per unit time required to increase the vehicle speed at the target acceleration from the actual vehicle speed.

In step S602, the controller 72 determines the current target input horsepower by adding the amount of increase in horsepower to the previous target input horsepower. In step S603, the controller 72 selects the larger of the current target input horsepower determined in step S602 and the above-described target input horsepower in stalling as the dynamic target input horsepower. In step S604, the controller 72 selects the smaller one of the dynamic target input horsepower determined in step S603 and the static target input horsepower described above as the target input horsepower.

As described above, the controller 72 determines the current dynamic target input horsepower by increasing the previous dynamic target input horsepower by the amount of horsepower increase corresponding to the accelerator operation amount. Then, the controller 72 increases the dynamic target input horsepower every unit time between the target input horsepower in stalling and the static target input horsepower.

Next, as shown in FIG. 6, in step S104, the controller 72 acquires the work implement operation amount. The controller 72 acquires the work implement operation amount from the signal from the work implement operation sensor 68.

Figure 13:
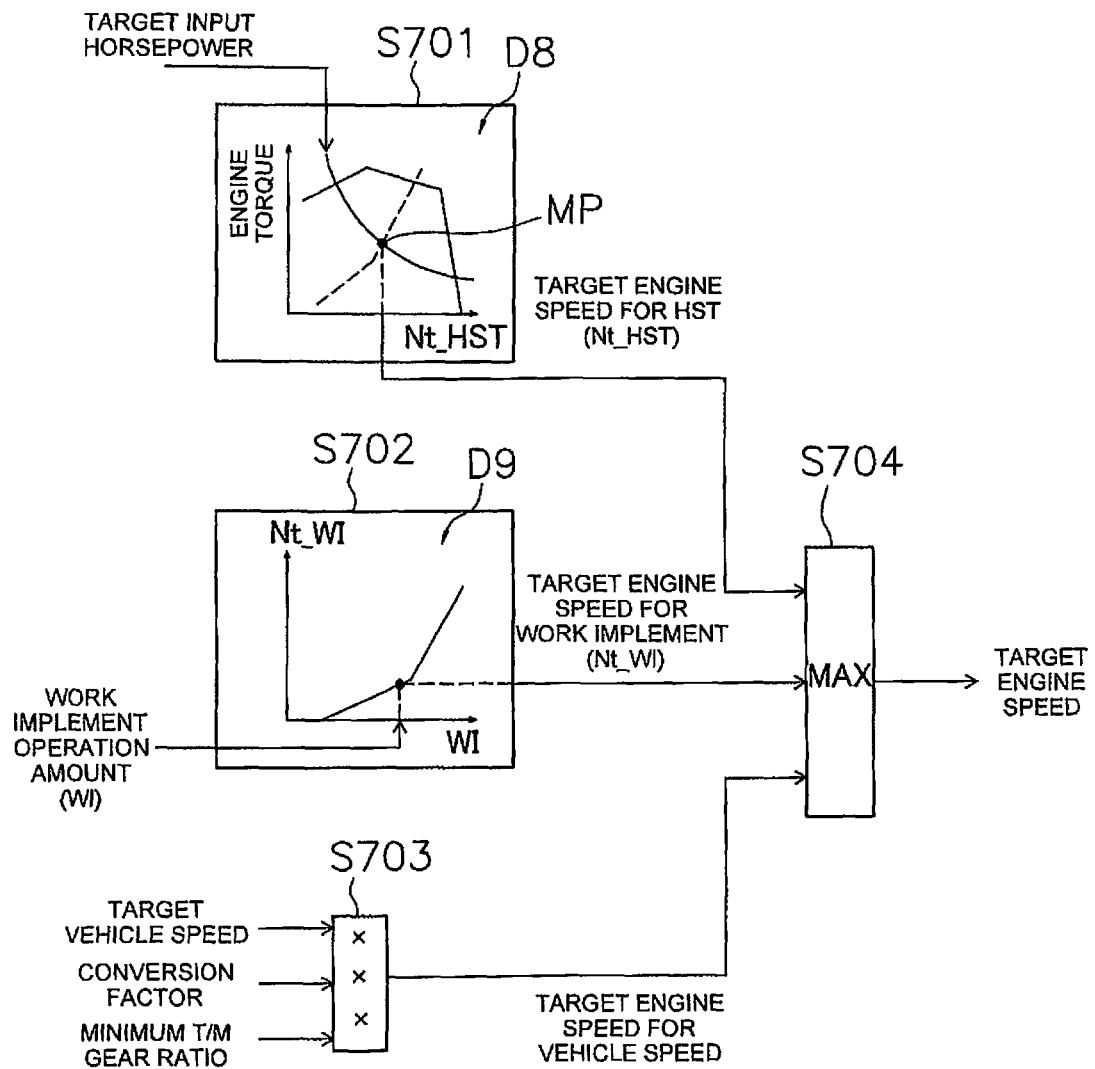
FIG. 13 is a diagram showing a process for determining a target rotational speed of an engine.

In step S105, the controller 72 determines a target engine speed. The controller 72 determines the target engine speed from the target input horsepower to the HST 23 and the work implement operation amount. FIG. 13 is a diagram showing a process for determining the target engine speed.

As shown in FIG. 13, in step S701, the controller 72 determines a target engine speed for the HST 23 from the target input horsepower determined in step S604. The storage device 71 stores engine torque-rotational speed data D8 that defines the relationship between the engine torque and the target engine speed for the HST 23. The controller 72 refers to the engine torque-rotational speed data D8 to determine the target engine speed corresponding to the target input horsepower to the HST 23. The controller 72 determines the target engine speed for the HST 23 such that the engine torque and the absorption torque of the traveling pump 31 coincide at a predetermined matching point MP on the equal horsepower line corresponding to the target input horsepower.

In step S702, the controller 72 determines a target engine speed for the work implement 3 from the work implement operation amount. The storage device 71 stores target rotational speed data D9 that defines the relationship between the work implement operation amount and the target engine speed for the work implement 3. In the target rotational speed data D9, the target engine speed increases as the work implement operation amount increases. The controller 72 refers to the target rotational speed data D9 to determine the target engine speed for the work implement 3 corresponding to the work implement operation amount.

In step S703, the controller 72 determines a target engine speed for vehicle speed from the target vehicle speed. The controller 72 determines a value calculated by multiplying the target vehicle speed by a predetermined conversion factor and the minimum transmission gear ratio as the target engine speed for the vehicle speed. The predetermined conversion factor is a factor for converting the target vehicle speed into the rotational speed of the output shaft of HST. The minimum transmission gear ratio is the minimum gear ratio of HST23.

In step S704, the controller 72 determines the target engine speed that is the maximum among the target engine speed for the HST 23, the target engine speed for the work implement 3, and the target engine speed for the vehicle speed.

Next, as shown in FIG. 6, in step S106, the controller 72 determines the target displacement of the traveling pump 31. The controller 72 determines the target displacement of the traveling pump 31 from the target vehicle speed and the target engine speed determined in step S704. Also, in step S107, the controller 72 determines the target displacement of the traveling motor 33. The controller 72 determines the target displacement of the traveling motor 33 from the target vehicle speed and the target engine speed determined in step S704.

Figure 14A:
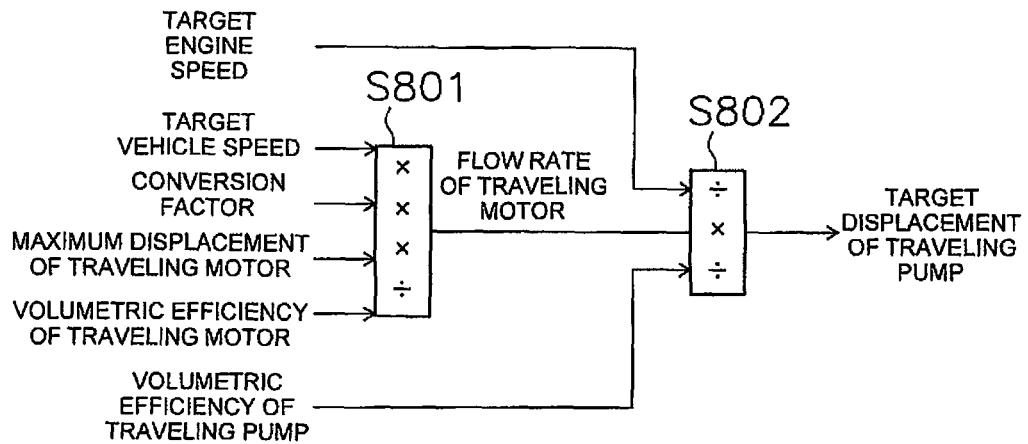
FIG. 14A and FIG. 14B are diagrams showing processing for determining target displacements of a traveling pump and a traveling motor.

FIG. 14A is a diagram showing a process for determining the target displacement of the traveling pump 31. As shown in FIG. 14A, in step S801, the controller 72 determines the flow rate of the traveling motor 33 from the target vehicle speed. The controller 72 determines, as the flow rate of the traveling motor 33, a value obtained by multiplying the target vehicle speed by a predetermined conversion factor and the maximum displacement of the traveling motor 33, and dividing by the volumetric efficiency of the traveling motor 33. The predetermined conversion factor is a factor for converting the target vehicle speed into the rotational speed of the output shaft of the HST 23.

In step S802, the controller 72 determines the target displacement of the traveling pump 31 from the target engine speed and the flow rate of the traveling motor 33. The controller 72 calculates a value obtained by dividing the flow rate of the traveling motor 33 by the target engine speed and the volumetric efficiency of the traveling pump 31 as the target displacement of the traveling pump 31.

Figure 14B:
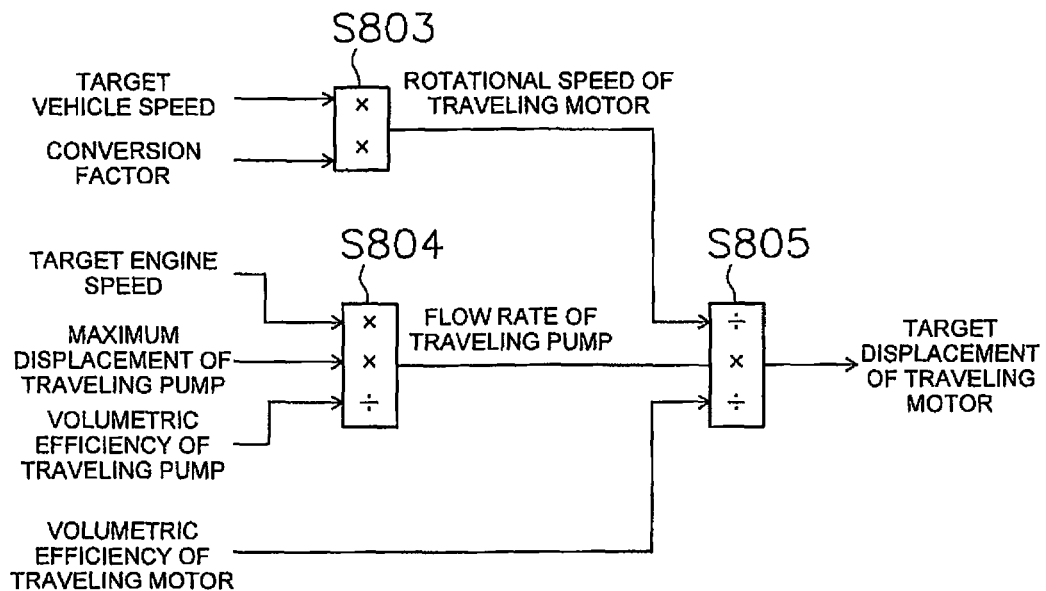

FIG. 14B is a diagram showing a process for determining the target displacement of the traveling motor 33. As shown in FIG. 14B, in step S803, the controller 72 determines the rotational speed of the traveling motor 33 from the target vehicle speed. The controller 72 calculates the rotational speed of the traveling motor 33 by multiplying the target vehicle speed by a predetermined conversion factor. The predetermined conversion factor is a factor for converting the target vehicle speed into the rotational speed of the output shaft of the HST 23.

In step S804, the controller 72 determines the flow rate of the traveling pump 31 from the target engine speed and the maximum displacement of the traveling pump 31. The controller 72 calculates the flow rate of the traveling pump 31 by dividing the value obtained by multiplying the engine speed by the maximum displacement of the traveling pump 31 by the volumetric efficiency of the traveling pump 31.

In step S805, the controller 72 determines the target displacement of the traveling motor 33 from the rotational speed of the traveling motor 33 and the flow rate of the traveling pump 31. The controller 72 divides the flow rate of the traveling pump 31 by the rotational speed of the traveling motor 33 and the volumetric efficiency of the traveling motor 33 to calculate the target displacement of the traveling motor 33.

Then, as shown in FIG. 6, in step S108, the controller 72 outputs a command signal. The controller 72 outputs a command signal to the fuel injector 24 to drive the engine 21 at the target engine speed. The controller 72 outputs a command signal to the pump displacement control device 45 to drive the traveling pump 31 at the target displacement. The controller 72 outputs a command signal to the motor displacement control device 35 to drive the traveling motor 33 at the target displacement.

In the work vehicle 1 according to the embodiment described above, the leakage flow rate is determined from the target HST differential pressure by referring to the leakage flow rate data D3, and the target flow rate of the traveling pump 31 is determined from the leakage flow rate. In stalling, the leakage flow rate from the driving hydraulic circuit 32 of HST23 is correlated with the HST differential pressure. Also, in stalling, the leakage flow rate substantially matches the flow rate of traveling pump 31. Accordingly, by referring to the leakage flow rate data D3, it is possible to accurately determine the target HST differential pressure, that is, the target flow rate of the traveling pump 31 corresponding to the target traction force. Thereby, the traction force in stalling can be controlled arbitrarily and precisely.

Figure 15:
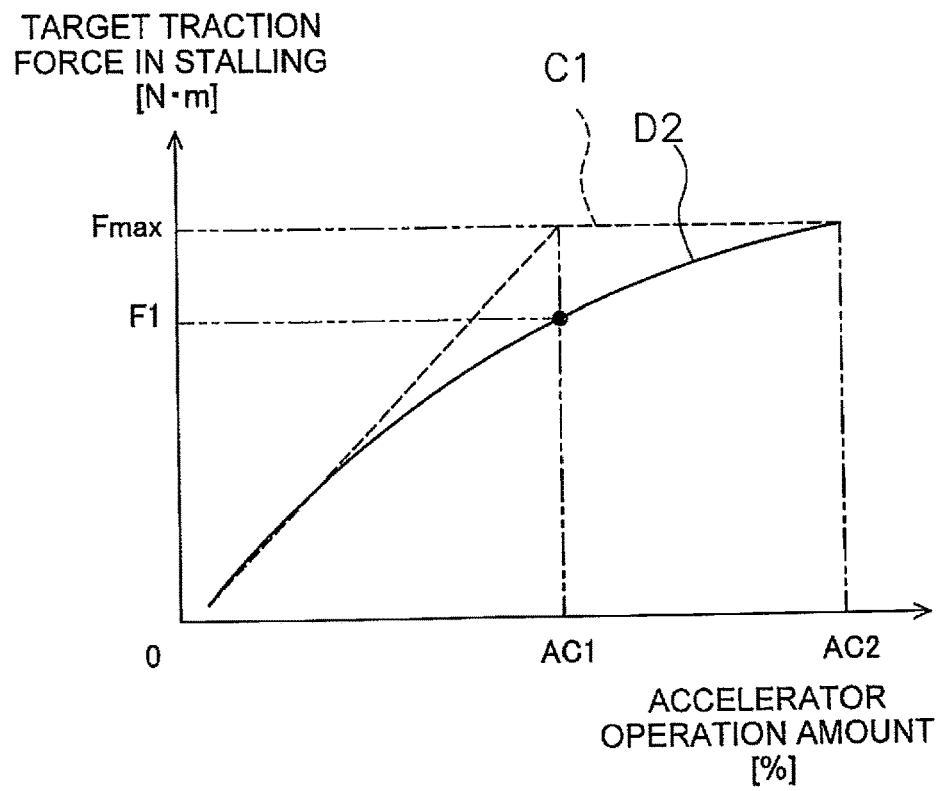
FIG. 15 is a diagram showing an example of target traction data.

For example, FIG. 15 is a diagram showing an example of the target traction data D2 described above. In FIG. 15, a broken line Cl indicates the relationship between the accelerator operation amount and the actual traction force in stalling in the work vehicle according to the comparative example. In the work vehicle according to the comparative example, when the accelerator operation amount is an intermediate value AC1, the actual traction force in stalling is maximum traction force Fmax, and when the accelerator operation amount is AC1 or more, the actual traction force in stalling is constant at the maximum traction force Fmax.

On the other hand, in the target traction data D2 according to the present embodiment, the target traction data D2 is set such that the target traction force becomes the maximum traction force Fmax when the accelerator operation amount is AC2 larger than AC1. AC2 is more preferably, for example, 100%. It is preferable that the target traction force is linearly increased in accordance with an increase of the accelerator operation amount in the range of 0 to 100% of the accelerator operation amount. However, AC2 may be smaller than 100%. For example, AC2 is preferably 80% or more. Alternatively, AC2 is preferably 90% or more.

By determining the target traction force based on the target traction data D2, the operability of the traction force in stalling can be improved. Further, as described above, by determining the target flow rate of the traveling pump 31 with reference to the leakage flow rate data D3, the target traction force specified in the target traction data D2 can be realized with high accuracy. Furthermore, since the unnecessary increase in engine speed can be suppressed, fuel efficiency can be improved.

In work vehicle 1 according to the present embodiment, the target traction force in stalling is corrected by multiplying the target traction force by the ratio according to the traction level. Then, the target differential pressure is determined from the corrected target traction force, and the target displacement of the traveling pump 31 is determined from the target differential pressure. Therefore, by controlling the displacement of the traveling pump 31 while maintaining the displacement of the traveling motor 33 at the maximum displacement, the maximum traction force according to the traction level can be realized. Thereby, the efficiency of the traveling motor 33 can be improved. Also, by referring to the leakage flow rate data D3, the target displacement of the traveling pump 31 is determined from the target differential pressure. Therefore, the maximum traction force according to the traction level can be realized with high accuracy.

Preferred embodiments of the present invention have been explained above. However, the present invention is not limited to the aforementioned preferred embodiments, and a variety of changes can be made without departing from the scope of the present invention.

The work vehicle 1 is not limited to a wheel loader, and may be another type of vehicle such as a motor grader. The configurations of the drive system and control system of the work vehicle 1 are not limited to those of the above embodiment, and may be changed. For example, the displacement of the traveling pump 31 may be controlled by another control valve, not limited to the pump control valve 47. That is, a control valve for controlling the pressure of the hydraulic fluid supplied to the pump control cylinder 46 via the pump pilot circuit 48 may be provided separately from the pump control valve 47.

Figure 16:
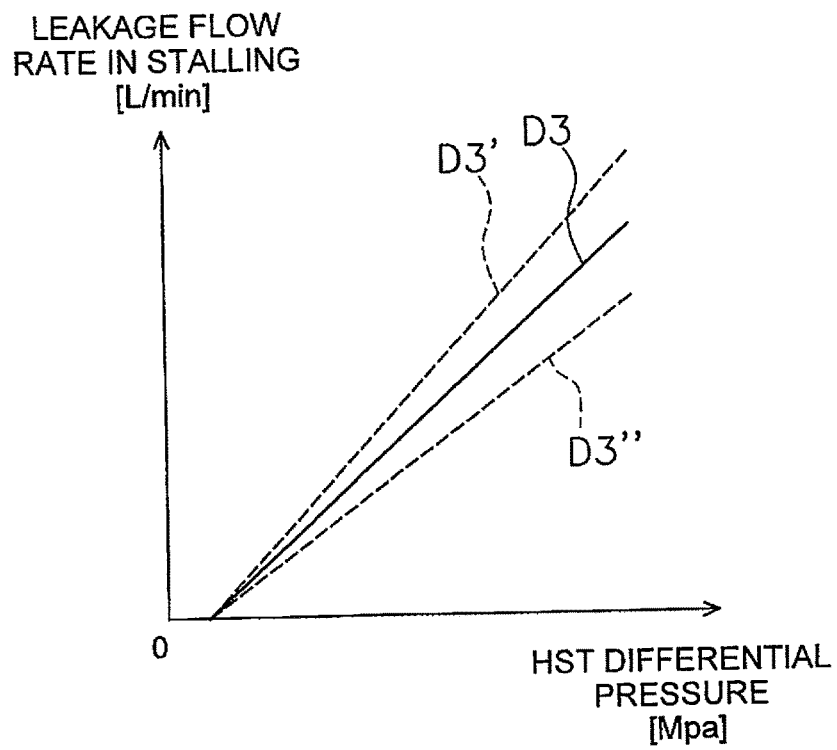
FIG. 16 is a diagram showing an example of the leakage flow rate correction according to the oil temperature.
Figure 17:
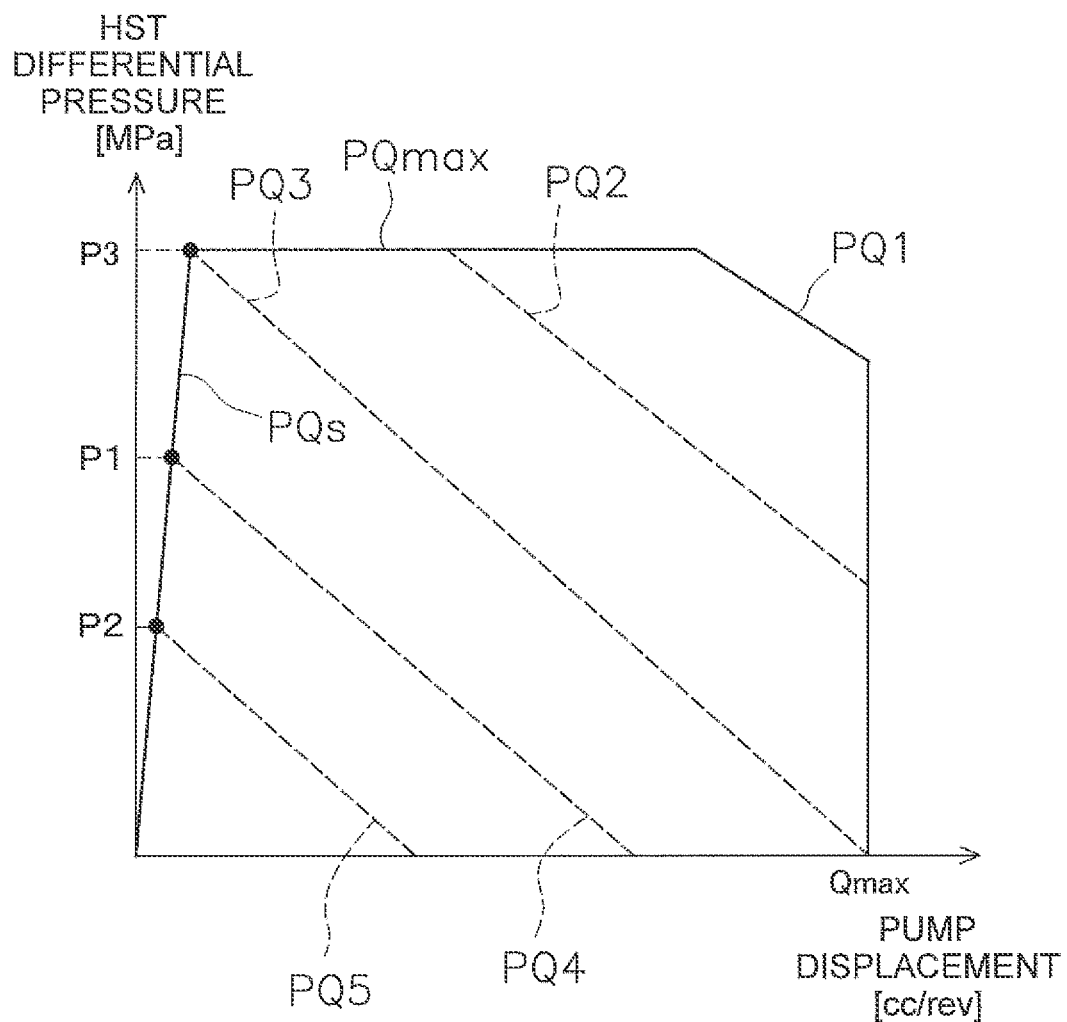
FIG. 17 is a diagram showing PQ characteristics of the traveling pump in the conventional art.
Figure 18A:
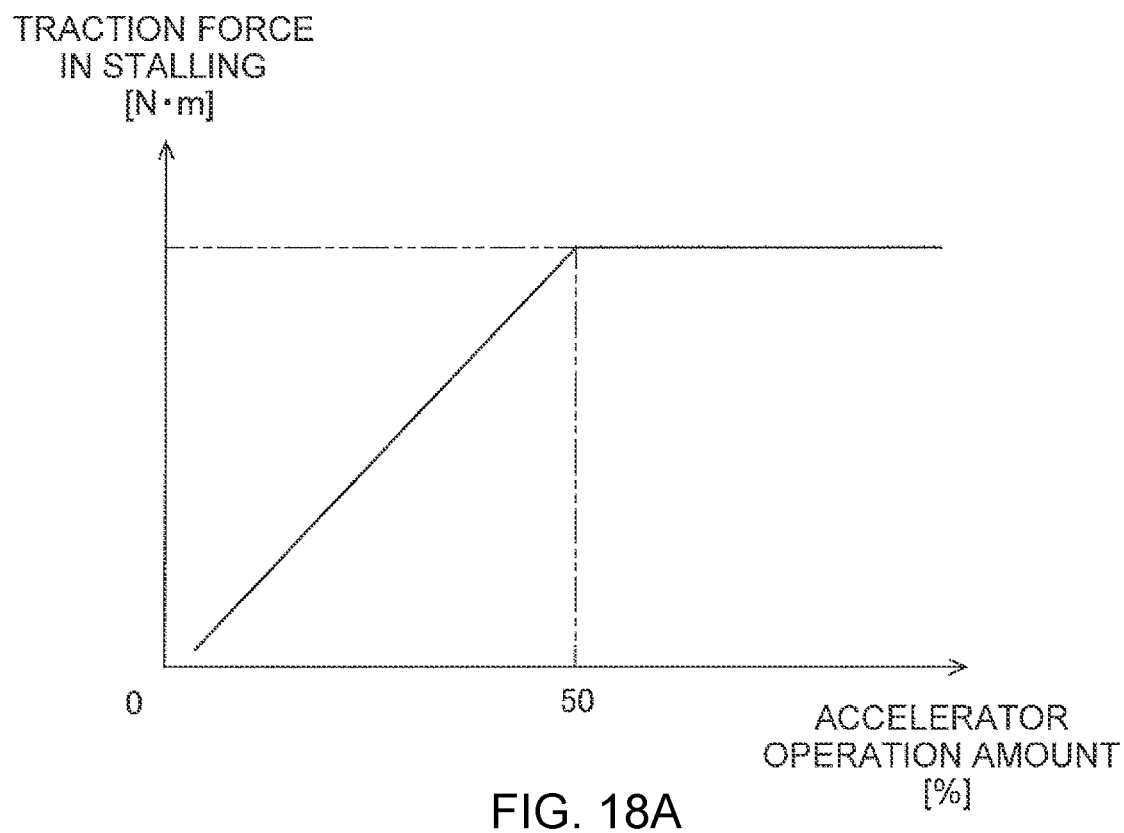
FIG. 18A and FIG. 18B are diagrams showing changes in traction force and engine speed with respect to the accelerator operation amount in the conventional work vehicle.
Figure 18B:
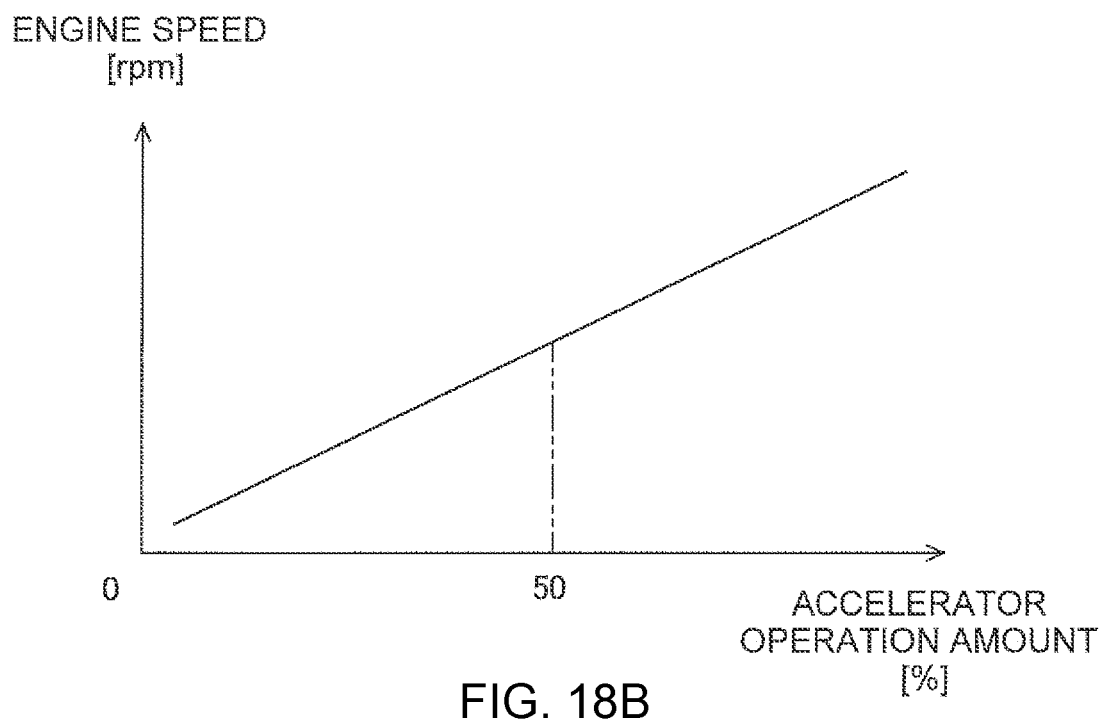

The controller 72 may correct the above-mentioned leakage flow rate based on the temperature of the hydraulic fluid. The controller 72 obtains the temperature of the hydraulic fluid (hereinafter simply referred to as "oil temperature") supplied to the traveling motor 33 by the signal from the temperature sensor 49. The controller 72 may correct the leakage flow rate data according to the oil temperature. For example, as shown by the broken line D3' in FIG. 16, the controller 72 may correct the leakage flow rate so as to increase the leakage flow rate in response to an increase in oil temperature. Alternatively, as shown by the broken line D3", the controller 72 may correct the leakage flow rate so as to decrease the leakage flow rate in response to the decrease in the oil temperature.

The parameters used for the various operations described above are not limited to those described above, and may be changed. Alternatively, parameters other than the above-described parameters may be used for the calculation. The various data described above may be represented, for example, by an equation, or may be in the form of a table, a map, or the like.

The order of the processes described above may be changed. Alternatively, some processing may be executed in parallel. For example, step S101 and step S104 may be executed in parallel.

The controller 72 may determine the target vehicle speed by a method different from the above embodiment. The controller 72 may determine the target input horsepower to the HST 23 by a method different from the above embodiment. The controller 72 may determine the target engine speed by a method different from the above embodiment. The controller 72 may determine the target displacement of the traveling pump 31 by a method different from the above embodiment. The controller 72 may determine the target displacement of the traveling motor 33 by a method different from the above embodiment. Even in such a case, it is possible to accurately determine the target flow rate of the traveling pump 31 corresponding to the target HST differential pressure by using the leakage flow rate.

In the above embodiment, the controller 72 increases the target input horsepower to the HST 23 every unit time between the target input horsepower in stalling and the static target input horsepower at the time of transition. However, the controller 72 may determine not only the target input horsepower in stalling but also another value corresponding to the accelerator operation amount as the lower limit of the target input horsepower to the HST 23.

According to the present invention, in a work vehicle provided with a hydrostatic transmission, the traction force in stalling can be controlled arbitrarily, accurately and efficiently.

The invention claimed is:

1. A work vehicle comprising:
an engine;
a hydrostatic transmission including
a traveling pump driven by the engine,
a hydraulic circuit including a first drive circuit and a second drive circuit, the hydraulic circuit connected to the traveling pump, and
a traveling motor connected to the traveling pump via the hydraulic circuit,
a closed circuit being formed by the traveling pump, the first drive circuit, the second drive circuit, and the traveling motor;
a storage device storing leakage flow rate data defining a relationship between a differential pressure of hydraulic fluid between the first drive circuit and the second drive circuit and a leakage flow rate of the hydraulic fluid in the hydraulic circuit in stalling; and
a controller in communication with the storage device, the controller being configured to
determine a target traction force of the work vehicle,
determine a target differential pressure that is a target value of the differential pressure from the target traction force,
determine the leakage flow rate from the target differential pressure with reference to the leakage flow rate data, and
determine a target flow rate of the traveling pump from the leakage flow rate.

2. The work vehicle according to claim 1, further comprising:
an accelerator; and
a sensor configured to output a signal indicative of an operation amount of the accelerator,
the controller being further configured to
receive the signal from the sensor, and
determine the target traction force from the operation amount of the accelerator.

3. The work vehicle according to claim 2, wherein
the storage device stores target traction data that defines a relationship between the operation amount of the accelerator and the target traction force, and
the controller being further configured to determine the target traction force from the operation amount of the accelerator with reference to the target traction data.

4. The work vehicle according to claim 1, wherein the controller is further configured to
determine a target torque of the traveling motor from the target traction force, and determine the target differential pressure from the target torque and a displacement of the traveling motor.

5. The work vehicle according to claim 1, further comprising:
a temperature sensor configured to output a signal indicative of a temperature of the hydraulic fluid supplied to the traveling motor,
the controller being further configured to
receive the signal from the temperature sensor, and
correct the leakage flow rate according to the temperature of the hydraulic fluid.

6. The work vehicle according to claim 5, wherein
the controller is further configured to correct the leakage flow rate so as to increase the leakage flow rate in response to an increase in the temperature of the hydraulic fluid.

7. The work vehicle according to claim 1, further comprising:
an input device usable to select a traction level,
the controller being further configured to
receive a signal indicative of the selected traction level from the input device,
correct the target traction force according to the selected traction level, and
determine the target differential pressure from the corrected target traction force.

8. The work vehicle according to claim 1, wherein the controller is further configured to
determine a target input horsepower to the hydrostatic transmission from the target flow rate of the traveling pump, and
determine a target rotational speed of the engine from the target input horsepower.

9. A method executed by a controller in order to control a work vehicle, the work vehicle including an engine and a hydrostatic transmission, the hydrostatic transmission including a traveling pump driven by the engine, a hydraulic circuit connected to the traveling pump, and a traveling motor connected to the traveling pump via the hydraulic circuit, the hydraulic circuit including a first drive circuit and a second drive circuit, a closed circuit being formed by the traveling pump, the first drive circuit, the second drive circuit, and the traveling motor, the method comprising:
determining a target traction force of the work vehicle;
determining, from the target traction force, a target differential pressure that is a target value of a differential pressure of hydraulic fluid between the first drive circuit and the second drive circuit;
determining a leakage flow rate from the target differential pressure with reference to leakage flow rate data defining a relationship between the differential pressure and the leakage flow rate of the hydraulic fluid in the hydraulic circuit in stalling; and
determining a target flow rate of the traveling pump from the leakage flow rate.

* * * * *